Figure 1:
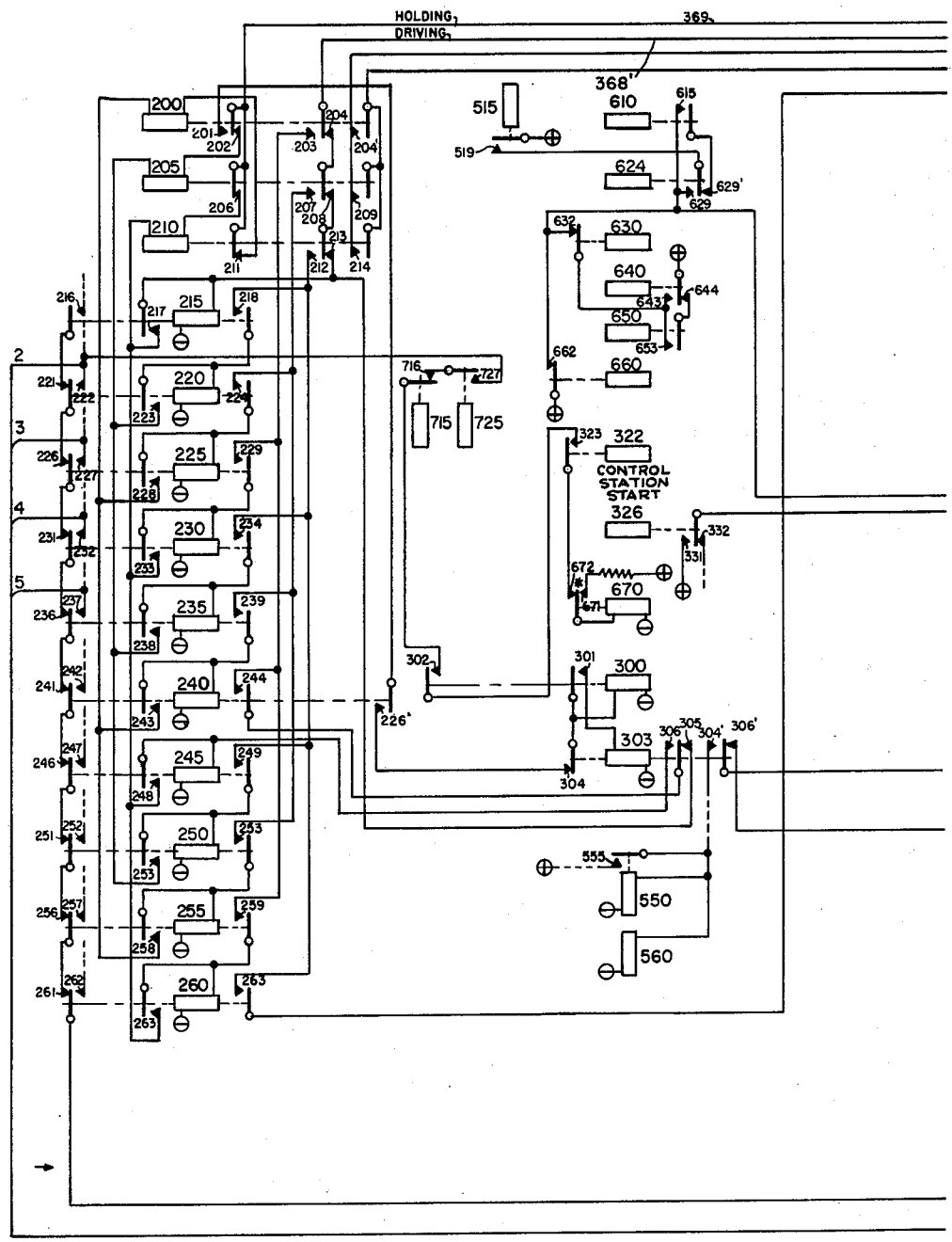

Jan. 28, 1964     L. R. BREESE     3,119,981
SUPERVISORY CONTROL SYSTEM
Filed June 5, 1957     5 Sheets-Sheet 1

INVENTOR.
LEMUEL R. BREESE

INVENTOR.
LEMUEL R. BREESE

Jan. 28, 1964    L. R. BREESE    3,119,981
SUPERVISORY CONTROL SYSTEM
Filed June 5, 1957    5 Sheets-Sheet 3

INVENTOR.
LEMUEL R. BREESE

INVENTOR.
LEMUEL R. BREESE

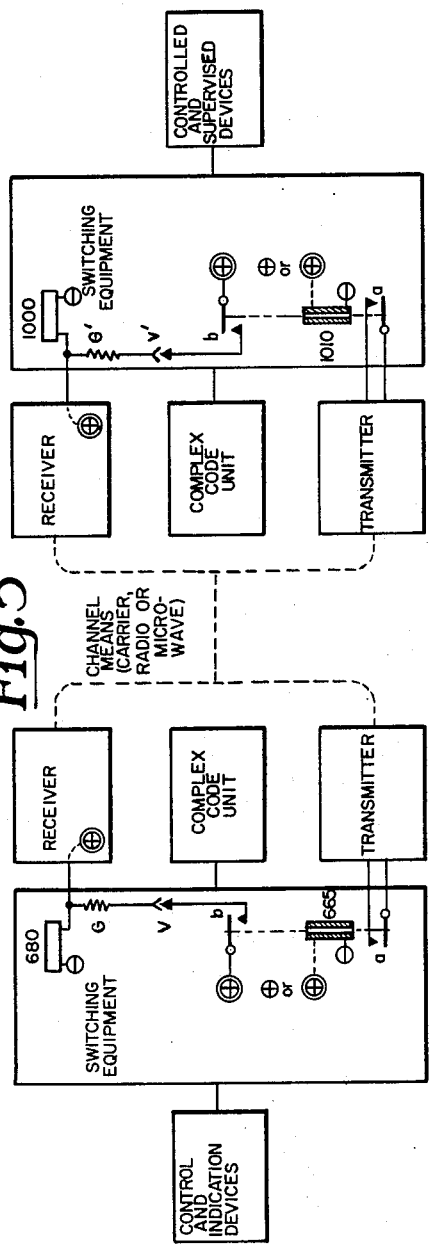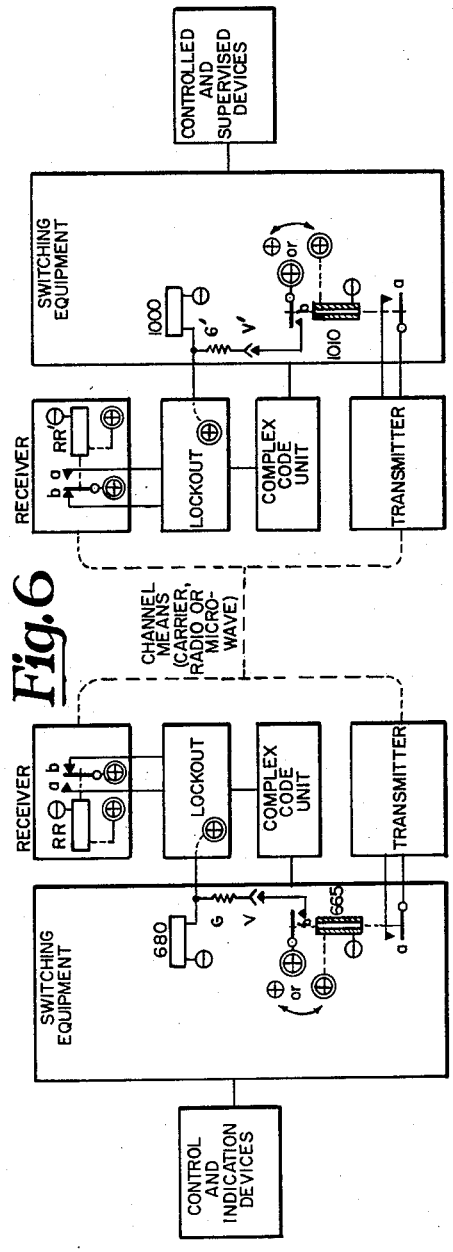

United States Patent Office 3,119,981
Patented Jan. 28, 1964

3,119,981
SUPERVISORY CONTROL SYSTEM
Lemuel R. Breese, Galion, Ohio, assignor to North Electric Company, Galion, Ohio, a corporation of Ohio
Filed June 5, 1957, Ser. No. 663,740
13 Claims. (Cl. 340—163)

The present invention relates, in general, to an automatic signalling system having a central station for controlling and supervising remote substation apparatus over a connecting communication path, and more specifically, to a supervisory system including a protection arrangement for guarding against false operation of the apparatus of the stations responsive to the occurrence of electrical transients in the interconnecting communication path.

Supervisory control systems have been extensively used in different fields to control switching apparatus located at various remote points to afford a central operator complete control over the components of a widely dispersed system. Such systems have, for example, been successfully employed in controlling circuit breaker equipment for power lines, flood gates, transformer switching and distribution stations, substation generating installations, and others too numerous to mention.

The reliability in operation is a primary requisite of the control system employed, in that the slightest error in operation might result in serious loss of life and property. It is a particular object of the present invention to provide an improved, more dependable type supervisory control arrangement which includes new and novel safeguard means therein for preventing false operation of the apparatus at the distant stations.

A system including a protection system which constituted an important step forward in the art was set forth in Patent No. 2,616,959 which issued on November 4, 1952 to Breese et al, and which is assigned to the assignee of this invention. Such arrangement includes a novel protection system which detects transients on the communication path extending between the control station and the substation, and effects reset of the equipment responsive to the detection of transient impulses. In such arrangement, the equipment is operative to transmit a preliminary or special group of impulses which act as a key to unlock the transient protection equipment at the stations, whereby the subsequent code or operating impulses transmitted by the control station is effective to operate the equipment at the selected stations which were unlocked by the key. Such system is extremely flexible, and is readily adjusted to trap any desired number of transient impulses, the specified arrangement set forth therein being adapted to guard against false operation by 3, 6, or 9 transient impulses. As a result of its flexibility, the apparatus is readily adapted for use in different localities having varied atmospheric and installation problems.

Notwithstanding the effectiveness of such arrangement in a large percentage of the areas, it has been discovered that in a certain number of locations the atmospheric conditions are such as to provide transients so dense as to penetrate the guarding arrangement of such type system, and it is the object of the present invention to provide a transient guarding arrangement for use with a supervisory system which affords reliable operation under all types of conditions.

It is a specific object of the invention to provide reliable protection against false operation by transient impulses in a microwave signalling arrangement.

The supervisory control system of the present invention includes a maze or labyrinth which normally protects the equipment at the stations against operation responsive to the occurrence of transient impulses on the channel. The "labyrinth or maze" in addition to requiring a predetermined number of "key" impulses such as 3, 6, etc., as in the previous disclosed system to effect unlocking of the stations, additionally requires the receipt of timed pauses between predetermined ones of the key or unlocking impulses. The transient impulses on the channel must be of a predetermined number, each of which is of a predetermined length, and each of which is separated from succeeding pulses by a pause of a predetermined length, the pause between certain of said impulses being different than the pause between other impulses. Ostensibly, the possibility of duplication of this complicated unlocking set of impulses by a transient disturbance is extremely remote.

It is apparent that the number of impulses used in the key, the length of the impulses transmitted, the number of timed pauses and the particular impulses between which the pauses are to occur, may be readily varied in accordance with the degree of protection desired. One particular successful embodiment disclosed hereinafter utilized to unlock the protection system comprises six preliminary pulses having an extended pause between the second and third impulses, and an extended pause between the fourth and fifth impulses. The transient protection equipment is unlocked only responsive to the receipt of the complex code followed immediately by a normal interpulse pause, and the first pulse of a selection code.

In the event that the timed pause is too short or too long the equipment is reset. Moreover, in the few instances in which the transient pulses and pauses are so timed as to simulate the unlocking "key" at the office and substation simultaneously, the system will reset or stall, as outlined in the chart "Preliminary Range of Six Impulses," set forth in the above identified patent, and reset or stall is effected. With the occurrence of transient impulses timed to simulate the unlocking "key" at the office and or the substation end alone, reset will occur with receipt of any number of transients. It is apparent that such system provides extremely reliable protection against false operation by transient impulses over an interconnecting channel.

It has been found that in certain microwave signalling installations certain transient conditions occur which are capable of circumventing even the complicated code arrangement of the above described invention. For example, in arrangements which use a microwave signal modulated by a frequency shift tone, the signal to noise ratio under certain atmospheric conditions may be such that the channel is essentially lost momentarily, and the microwave terminal equipment generates noise which the receiver equipment detects as statistically random impulses. If these pulses persist over an appreciable period of time, the complex code may be duplicated and the system may be unlocked to permit false operation of the equipment. The present invention includes a further protective system for rendering the possibility of improper operation by transients in such type system for all intents and purposes statistically impossible.

The novel protective system basically comprises an arrangement which temporarily locks out the equipment for a predetermined time period (ten seconds in the present example) whenever the equipment is reset as a result of the detection of a transient. In the event that a further signal is received over the channel which is sufficiently similar to an operating impulse during the ten second lockout interval, the interval is prolonged for a further ten second period. The receipt of a further impulse during such lockout period results in a further extended lockout of the system. In that the possibility of the first received random impulses unlocking the system are practically nil, it is apparent that the provision of the additional lockout arrangement to prevent the accumulation of random impulses from unlocking the system results in an arrangement which renders the improper operation of the system, for all intents and purposes, practically impossible.

Other objects and advantages of the present invention will become apparent with reference to the following specification and accompanying drawings wherein basic embodiments of the structure are illustrated, and in which:

FIGURES 1–4 when arranged in adjacent relation are illustrative of the circuitry for providing the complex code and lockout equipment in the system disclosed in the aforeidentified patent; and FIGURE 5 discloses the complex code unit as connected in a carrier radio and microwave channel arrangement including modifications of a known system to adapt same for carrier radio and microwave operation; and FIGURE 6 illustrates the manner in which a lockout unit is included in the system of FIGURE 5.

GENERAL DESCRIPTION

For purposes of simplicity the novel transient protection arrangement of the present disclosure is illustrated as a part of a known supervisory system which was fully described in Patent No. 2,616,959. For the purposes of clearly identifying the novel structure of the present invention, and more clearly distinguishing same from the known portions of the supervisory system, a number of components of the Breese et al. patent have been repeated in a schematic manner, and the identification numerals for the components originally shown in the patent have been retained in the present disclosure. Such minor modifications of the connections which have been required to include the transient protection circuit are disclosed in detail herewith.

In such embodiment the supervisory system basically comprises a dispatch or control station CS which is adapted to automatically control equipment disposed at a distantly located substation S1 over a single signalling channel comprising a pair of line conductors 85, 86. In the disclosed arrangement, a control panel at the control station enables an attendant thereat to effect independent selective closing and tripping of the different circuit breaker units disposed at the substation, to instantly determine the operated condition of any one of these circuit breaker units, and to receive telemetered information concerning the circuit controlled at the selected point.

The circuit breaker units at the substations are of the conventional type, the circuit breaker at a typical point of substation S1, for example, comprising a set of power controlling contacts (not shown) a close coil, a trip coil, and a set of auxiliary contacts. Momentary energization of the close coil effects closing of the breaker, and mechanical means hold the breaker in such position until such time as a momentary energization of the trip coil or occurrence of a line fault effects reopening thereof. The auxiliary switch contacts are used to indicate the breaker position to the equipment at the control station.

The control equipment illustrated in the present embodiment is commonly referred to as a two-digit selection system which is operative to select any one of one hundred substation points (circuit breakers), it being understood that the features of the invention may also be embodied in the conventional one and three digit systems without departing from the scope of the invention.

In the two digit system, the points (circuit breaker and/or meter) are divided into groups of ten, whereby the selection of the points may be accomplished by sequentially transmitting the group and unit identification numbers of the desired circuit breaker. For example, group 1 of the points may comprise circuit breakers 1 to 10, group 2 may comprise circuit breakers 11 to 20, group 3 may comprise circuit breakers 21 to 30, etc. Thus, the circuit breaker at point 12 is the second point in the second group of points, and in selecting this point the group selection digit 2 and the point selection digit 2 are transmitted sequentially. Upon arriving at a point, control of the circuit breaker is accomplished by transmission of one of the control codes, which in the given embodiment, comprise three pulses for "trip" and five pulses for "close." The number of impulses selected for close or trip codes is, of course, arbitrary.

The equipment for initiating the transmission of these coded group and unit impulses to effect selection of a chosen circuit breaker, and for thereafter initiating the control code of three or five impulses, generally includes a control panel disposed at the control station for convenient operation by an attendant thereat. The control panel in addition to providing selection and control of the circuit breakers at the substation is arranged to indicate automatic changes of position of the circuit breakers and to effect other supervisory operations necessary to the accomplishment of complete remote control.

The control panel may include a group of common control units, such as an alarm key, reset key, an alarm lamp, a trip key, a close key, a check key, an alarm bell, alarm lamp and line supervision lamp. A further section of the control panel is divided into a series of individual control and indicating panels, each of which is correspondingly individual to one of the circuit breakers located at the substation. Each of the individual panels may comprise an escutcheon plate which mounts an individual selection key for selecting its associated substation circuit breaker, a white selection lamp, a red indication lamp, and a green indication lamp. The red indication lamp is illuminated whenever the circuit breaker located at the substation is in the closed position, and the green indication lamp is illuminated whenever the circuit breaker is in the open position. The white lamp associated with each of the individual control panels is operated with operation of the selection key and indicates to the operator that a particular point has been reached.

Should the associated circuit breaker at the substation automatically change position, an alarm bell and an alarm lamp at the dispatch office flash to draw the attention of the attendant thereat, the red lamp flashing if the circuit breaker is being closed, and the green lamp flashing if the circuit breaker is being opened. Control keys at the panel enable the operator to silence the alarm bell, turn off the alarm lamp, or stop the flashing of the red and green indicating lamp by operating the alarm key.

A reset key on the control panel enables the operator to reset the equipment at the substation and the control office in the event of the occurrence of a stalled condition, that is, a condition in which some of the relays are in the operated condition and have failed to restore the equipment to normal.

The selection of a circuit breaker is accomplished by merely operating the selection key at the control office which is individual to the chosen circuit breaker. As the key closing operation is performed, the equipment at the control office is automatically effective to condition itself for the transmission of both a set of "key" pulses for unlocking the substation and control office equipment, and the group identification digit of the selected circuit breaker.

With receipt of the first impulse, the equipment at the substation is operative to condition the equipment thereat for acceptance of the incoming coded impulses. As the key or protective impulses are transmitted from the office to the substation, the counting chains at each of the installations are sequentially advanced to unlock the associated equipment whereby, with receipt of the following group identification pulses, the equipment at both stations will be operated to register the group identification numeral. It is to be noted that protective pulses are prefixed on the first digit only, and that the equipment is completely conditioned for the entire series of codes by the first protective impulses transmitted. Following group registration, the transmitting equipment at the control office is automatically released and the control station is placed in the receiving condition. The substation equipment on completion of the registration of the group selection digit, releases its receiving units, and initiates operation of the transmitting apparatus thereat to transmit a combination of impulses to the control office which is indicative of the particular group actually selected, this checking operation being known as the group check operation.

The equipment at the control office is operative in response to receipt of this checking code to compare the original and check-back signals, and, upon agreement, to deenergize its receiving equipment, and reenergize its transmitting equipment to effect the transmission of the coded impulses which are representative of the unit identification numeral for the chosen circuit breaker.

The substation equipment is operated responsive to the receipt of the point selection digit, and is effective to register the particular digit which has been transmitted. The check code, known as the point check digit, is thereupon transmitted back to the control office by the substation to indicate the particular point which has been selected.

The equipment at the control office accepts the incoming point check code and upon agreement, notifies the attendant by the lighting of the white lamp that selection is complete. The attendant accordingly operates the close key or the trip key, and the corresponding control code is transmitted to effect the operation of the selected unit at the substation to the close or trip position, as the case may be.

Following operation of the desired circuit breaker at the substation, a close or trip indication code, as the case may be, is transmitted by the equipment thereat to the control office to indicate to the attendant that the final operation of the unit has been accomplished.

The equipment at the substation is thereupon operative to restore its operating equipment to normal and to effect a similar restoration of the equipment at the dispatcher's office. The line supervision equipment is likewise restored to its normal condition.

The novel protection equipment for use in the supervising system basically comprises a complex code unit, or transient protection device, consisting of relays K1–K7 and associated control circuitry at each station, and a special lockout unit including relays K8–K10 and associated control circuitry at each station. In that the transient protection system can be included as a unit or in part, optional indications are provided and indicated by the letters A and B, the A wiring being used to provide complex code unit alone, and the B wiring being used to provide both the complex code unit and the lockout unit. Certain minor modifications of the supervisory system are necessary to incorporate the complex code unit and lockout unit in the system and are further described hereat.

The complex code unit includes terminals C1–C8 for connecting same into an existing supervisory system. Terminals C1 and C6 are connected in series with the circuit of the reset relay 336 to permit operation of the reset relay by the complex code unit responsive to detection of a transient condition, and to provide a control circuit for the relay K5 of the complex code unit. The positive potential supply circuit for the selection contact chain of the counting chain relays 215—260 has been changed by eliminating contacts 302 of relay 300 from this circuit to permit energization of the selection chain responsive to the reception of pulses prior to group selection. The selection chain, in such operation, provides energizing battery from contacts 371 over terminals C2, C3, C4, C5 to the complex code unit to control the operation of relays K1–K4 therein. The same contacts 302 have now been inserted in the circuit for group stop relay 670 to prevent premature operation thereof during operations of the selection chain prior to receipt of the group code. Terminals C7 and C8 of the complex code unit are connected in series with the circuit of transmitting relay 665, whereby the operation of the transient relay 665 is controlled by the complex code unit.

Other minor modifications include connection of the operating circuit of relay 300 over make contacts 226' of relay 240 (the sixth counting chain relay) instead of over make contacts 226' of relay 225 (the third counting chain relay), and connection of contacts 305 and 306 of relay 303 between relays 240 and 245, instead of 225 and 230, to provide a preliminary range of six key impulses instead of the three key impulses set forth in the patent disclosure.

At the substation, terminal S1 connects the complex code unit thereat to the reset relay 845 to permit reset of the system with detection of transients by the complex code unit, and terminal S6 of the complex code unit is connected to one of the energizing circuits which previously operated reset relay 845. Contacts 852 of relay 850 (which corresponds to contacts 302 on relay 300 at the control station) have been rearranged in the same manner at the substation. Terminals S2–S5 being coupled for the complex code unit are coupled to the selection chain at the substation in the manner of terminals C2–C5 at the control station. Terminals S7–S8 are connected in series with the energizing circuit for sending relay 1010 at the substation, and the control circuits for protection relays 850, 855 have been rearranged to provide a preliminary range of six impulses in the manner of the control station arrangement.

One of the counting chain hold circuits at both stations have been modified by the inclusion of contacts designated as $a$, $b$; $a'$, $b'$, at the control and substations respectively, for the purpose of cancelling short pulses which are of sufficient duration to activate the counting chain and of insufficient duration to operate the receiving control relays 380 and 830 at the respective stations.

With the accomplishment of the foregoing connections including the B wiring, the complex code unit and lockout unit are effectively incorporated in an existing supervisory control system.

GENERAL OPERATION

As noted above, in initiation of an operation at the control station, the attendant operates a selection key on the control board associated with the particular point at which a control operation is desired, and the equipment automatically effects the transmission of the interlocking key followed by the group selection code. A further series of selection and check codes are transmitted between the control station and the substation to effect the selection of the desired point, the operation of the apparatus at the point, and the reset of the equipment. Since the operation of the equipment in effecting such control has been fully discussed in the described patent, the following description is limited to a brief summary of the operational steps which occur with enablement of the system by the attendant.

(1) The attendant depresses the proper key and the control station transmits a set of preliminary pulses followed by the group selection code indicated by the particular key which has been operated.

(2) The substation returns the group check code.

(3) The control station transmits the point selection code.

(4) The substation returns the point check code.

(5) The control station transmits the control code.

(6) The substation returns the indication code.

(7) The control station transmits the reset signal.

It should also be recalled that the following steps occur in effecting an automatic reporting from the substation to the control station:

(1) The substation transmits the preliminary pulses followed by group selection code.

(2) The control station returns the group check code.

(3) The substation transmits the point selection code.

(4) The control station returns the point check code.

(5) The substation transmits the indication code.

(6) The control station transmits the reset signal.

A brief summary of the operation of the different ones of the relays is also set forth hereat for the purpose of simplifying consideration of the operation of the complex code and lockout units. Briefly, information is transmitted from the control station to the substation by operating transmitting relay 665 at the control station to connect positive and negative potential to channel wires 86 and 85 respectively, whereby receiving relay 680 at the control station and receiving relay 1000 at the substation are responsively operated. Information is transmitted from the substation to the control station by operating transmitting relay 1010 at the substation to connect positive and negative potential to channel wires 86 and 85 respectively, whereby receiving relay 1000 at the substation and receiving relay 680 at the control station are responsively operated.

The operation of the control station receiving relay 680 advances the counting chain comprising counting relay 215–260 and sequence relays 210–260 in accordance with the number of impulses received. The operation of substation receiving relay 1000 advances the counting chain comprising counting relays 915–960 and sequence relays 910–990 in accordance with the number of impulses received.

Control station relays 340, 350, and 360 operate to mark a sending condition at the control station; similarly substation relays 810, 815, and 820 operate to mark a sending condition at the substation.

Control station relays 370, 380, and 384 operate to mark a receiving condition at the control station; similarly substation relays 825, 830, and 835 operate to mark a receiving condition at the substation.

Control station relays 322 and 326 mark the fact that the control station is the station initiating action; and substation relays 875 and 880 mark the fact that the substation is the station originating action.

Substation relay 870 at the substation marks the substation as being the first of the stations (control and sub) to receive.

Control station relays 300 and 303 mark the successful receipt of the preliminary range of six impulses at the control station; substation relays 850 and 855 mark a similar condition.

If signalling is initiated by the control station, control office relay 670 operates at the end of the group selection code, relay 660 at the end of the group check code, relay 640 at the end of the point selection code, and relay 630 at the end of the point check code.

If automatic reporting is received by the control office relay 660 operates at the end of group selection, relay 650 at the end of group check, relay 630 at the end of point selection, and relay 624 at the end of a point check.

If signalling is initiated by the substation, substation relay 1090 operates at the end of group selection, relay 1080 at the end of group check, relay 1060 at the end of point selection, and relay 1050 at the end of point check.

If codes are received by the substation for control purposes, relay 1080 operates at the end of group selection, relay 1070 at the end of group check, relay 1050 at the end of point selection and relay 1040 at the end of point check.

Control station relays 550 and 560 are group selection control relays for the control station; and substation relays 1130 and 1140 are group selection control relays for the substation.

Control station relay 610 operates at the end of a control code, and control station relay 515 operates after an indication has been received and recorded.

Relay 1030 at the substation operates to start transmission of a supervisory indication code indicating the position of equipment, and substation relay 1020 operates to stop impulsing of said code.

Control station relays 336, 390, and 600 function in conjunction with reset; substation relays 805, 840, and 845 function with reset at the substation, relay 805 also being used for substation regular lockout.

A brief description of certain fundamental operational features of the system including the above described relays is now set forth.

I. *General Circuit Operation*

1. LINE CIRCUIT

The signal transmissions for controlling the equipment at the respective stations is accomplished over line circuit including conductors 85, 86. The line circuit in the direct current signalling embodiment includes a parallel line circuit connected for use by signal transmitting relays 665 and 1000 at the control station and at the substation respectively; and receiving relays 680 and 1000 at the control station and at the substation respectively.

The control station signal transmitting relay 665 in its operation connects positive and negative potentials to the line circuit to thereby operate line relays 680 and 1000 at the control and substation in parallel, the circuit for signal transmitting relay 680 extending from direct positive potential (indicated as ⊕) through resistor 659, contacts 668, rectifier 664 in the forward direction, A-wiring, winding of relay 680, A-wiring, resistor 674, contacts 667, resistor 658 to negative potential; and the circuit for the operation of relay 1000 extending from direct positive potential, resistor 659, contacts 668, conductor 86, rectifier 1006 in the forward direction, A-wiring, winding of relay 1000, A-wiring, contacts 1014, conductor 85, contacts 667, and resistor 658, to negative potential.

The substation apparatus effects signal transmission by pulsing relay 1010, which in turn connects positive and negative potentials to the line wires to operate line relays 680 and 1000 in parallel, the circuit for relay 1000 extending from direct positive potential over resistor 1013′, contacts 1013, conductor 86, rectifier 1006 in the forward direction, A-wiring, winding of relay 1000, A-wiring, resistor 1007, contacts 1015, resistor 1015′, to negative potential; and the circuit for relay 680 extending from direct positive potential, over resistor 1013′, contacts 1013, conductor 86, rectifier 664 in the forward direction, A-wiring, winding of relay 680, A-wiring, contacts 666, conductor 85, contacts 1015, resistor 1015′, to negative potential.

In the following description the symbol ⊕ indicates direct positive potential, i.e. the positive pole of the battery; ⊖ indicates direct negative potential, i.e. the negative pole of the battery; and that ⊕ indicates controlled or "indirect" positive potential. At the control station ⊕ through contacts 392 of reset relay 390 feeds all points showing symbol ⊕. At the substation ⊕ through contacts 842 of reset relay 840 and contacts 807 of lockout relay 805 feeds all points showing symbol ⊕. Also a broken line – – – indicates contacts of Patent 2,616,959, not shown, but indicated.

2. CONDITIONING CIRCUITS EFFECTIVE ON SENDING AND RECEIVING

When the control station is sending and the substation is receiving, ⊕ through contacts in the control station indicated by dotted line and through the winding of relay 369 to battery operates sending control relay 360 which in turn operates relays 350 and 340 in parallel. Sending relays 360 and 340 at contacts 362 and 342 respectively open the circuit of receiving control relay 384 to prevent operation thereof by line relay 680 in its operation.

At the substation the line relay 1000 operates responsively, and at its contacts 1001 drives the chain as each impulse is received and also completes a circuit extending from negative battery over winding of relay 835, contacts 823, 813, 843, 1001 and negative battery. Relay 835 operates, and being of the slow release type does not release between pulses, and at its contacts 838 prepares a circuit for relay 830 which is completed when the first counting chain sequence relay 910 operates, the circuit extending from positive potential over contacts 838, 911, the winding of relay 830 to negative potential. Sequence relays 900, 905, 910 at contacts 911, 906, and 901 maintain the circuit energized as the counting chain advances. Relay 830 operates and at its contacts 831 locks independent of relay 835, and at its contacts 832 operates relay 825 over an obvious circuit. Relay 825 operates, and at its contacts 827 prepares an operating circuit for the complex code unit at the receiving station.

When the control station has completed its impulse transmission, relay 360 restores and in turn interrupts the circuits for relays 350 and 340. Relay 350 releases immediately, and relay 340 restores after an interval as determined by its slow release characteristic. At the substation relay 1000 interrupts the circuit for slow to release relay 835, which relay releases after its predetermined interval. As the counting chain sequence relays release, relay 830 restores and in turn releases relay 825.

When the substation is sending and the control station is receiving an analogous operation occurs. Briefly stated, the substation apparatus controls operation of receiving control relay 820 which in turn operates relays 815 and 810. Relay 835 is prevented from operating by open contacts 823 and 813. Control station relay 680 operates and at its contacts 681 drives the counting chain as the successive impulses are received, and also completes an energizing circuit for receiving control relay 384, the circuit extending from positive potential over contacts 681, 391, 362, 342 and the winding of relay 384 to negative potential. As the first sequence relay operates, an energizing circuit is completed for relay 380 which operates, and in turn operates relay 370.

When the substation has completed its impulse transmission relays 820, 815, and 810 release at the substation; and relays 384, 380 (the sequence relays), and 370 restore at the control station.

3. COUNTING CHAINS

It should be observed that line relays 680 and 1000 are non-operated with the system in the normal at rest condition. Reset relay 390 at the control station is thereby normally operated over the circuit which extends from positive potential through contacts 682 and the winding of relay 390 to negative potential. Reset relay 840 at the substation is normally operated over the circuit which extends from positive potential over contacts 1002 and the winding of relay 840 to negative potential. Both of these reset relays have slugged and sleeved slow-release characteristics to prevent release between pulses of the line relays, and require a long reset pulse of the line relays to effect restoration thereof.

As the operation of the counting chains at control station and substation are identical, it is believed that a review of the operation at the control station will suffice, it being understood that during regular operation both ends are driven simultaneously by the pulsing of relays 680 and 1000 in parallel.

Briefly as relay 680 operates on the first pulse, positive potential is extended over contacts 681, 391, 338, driving conductor 368', through contacts 204, 208, 213 and the winding of first counting chain relay 215 to negative potential.

Relay 215 operates and at its contacts 217 prepares a holding circuit for itself in series with the first sequence relay 210 over the circuit which extends from negative potential through the winding of relay 215, contacts 217, the winding of relay 210, contacts 206, to ground on the holding conductor 369, which ground is described in more detail hereinafter. Relay 215 extends its operating ground over contacts 217 to relay 210, and with ground on both sides of its windings relay 210 is shunted.

Line relay 680 releases at the end of the first pulse to remove the shunt from relay 210, and to effect the operation of relay 210 in series with relay 215.

With receipt of the second impulse, relay 680 reoperates, and the second counting chain relay 220 is energized over a circuit extending from ground over contacts 681, 391, 338, driving conductor 368', contacts 204, 208, 212, 218, and the winding of relay 220 to negative potential. The second counting chain relay 220 operates and at its contacts 223 prepares a circuit for the second sequence relay 205 in series with relay 220, relay 205 being shunted at this time.

When relay 680 releases at the end of the second pulse, the shunt is removed from relay 205, and relay 205 operates in series with relay 220. Relay 205 at its contacts 206 releases relays 215 and 210.

As the third pulse is received, relay 680 reoperates and completes a path for the third counting chain relay 225 which extends from positive potential, contacts 681, 391, 338, driving conductor 368', contacts 204, 207, 224, and the winding of relay 225 to negative potential. Relay 225 operates to prepare a circuit for effecting the subsequent operation of third sequence relay 200 in series with relay 225, relay 200 being shunted at this time.

When relay 680 releases at the end of the third pulse, the shunt is removed from relay 200, and relay 200 operates in series with relay 325 over the path which extends from negative potential over the winding of relay 225, contacts 228, the winding of relay 200, and contacts 211 to ground on the holding conductors. Relay 200 at its contacts 202 releases relays 220 and 205.

As the fourth pulse is received relay 680 reoperates to complete a circuit for the fourth counting chain relay 230 which extends from positive potential over contacts 681, 391, 338, 203, 229, the winding of relay 230 to negative potential.

As relay 680 releases at the end of the fourth pulse, relay 210 operates in series with relay 230 over the path which extends from negative potential over the winding of relay 230, contacts 233, the winding of relay 210, and contacts 206, to ground on the holding conductor. Relay 210 at its contacts 211 releases relays 225 and 200.

With receipt of the fifth pulse, relay 680 reoperates to complete a circuit for the fifth counting chain relay 235 which extends from positive potential over contacts 681, 391, 338, 204, 208, 212, 234, the winding of relay 235, to negative potential.

When relay 680 releases at the end of the fifth pulse, second sequence relay 205 is operated in series with relay 235 over the circuit which extends from negative potential over the winding of relay 235, contacts 238, the winding of relay 205, and contacts 202 to ground on the holding conductor 369. Relay 205 operates and at its contacts 206 releases relays 230 and 210.

With receipt of the sixth pulse, relay 680 completes a circuit for the sixth counting chain relay 240 which extends from positive battery over contacts 681, 391, 338, 203, 207, 239, and the winding of relay 240 to negative potential.

When relay 680 releases at the end of the sixth pulse, the third sequence relay 200 operates in series with relay 240 over the circuit which extends from negative potential over the winding of relay 240, contacts 243, the winding of relay 200, contacts 211, to ground on the holding conductor 369. Relay 200 at its contacts 202 restores relays 235 and 205.

With relays 240 and 200 both operated protection relay 300 operates over the path which extends from negative potential over the winding of relay 300, contacts 304, 226' on relay 240, and contacts 201, to ground on the holding conductor 369. Relay 300 prepares a circuit for relay 303 to operate in series with relay 300, but relay 303 is shunted by the operating ground of relay 300.

With receipt of the seventh pulse, relay 680 operates to complete an energizing circuit for the first counting chain relay 215 over the path which extends from positive battery over contacts 681, 391, 338, 203, 244, 306 and the winding of relay 215 to negative potential. Relay 215 prepares a circuit for relay 210 to operate in series with relay 215, but relay 210 is shunted.

When relay 680 releases at the end of the seventh pulse, relay 215 operates in series with relay 210 over the path which extends from negative potential over the winding of relay 215, contacts 217, the winding of relay 210, contacts 206 to ground on the holding conductor 369. Relay 210 operates and at its contacts 211 releases relays 240 and 209 whereupon the shunt is removed from relay 303 to operate same in series with relay 300 over the path which extends from positive potential over the winding of relay 303, contacts 301, and the winding of relay 300 to negative potential. Relay 303 at its contacts 304 further opens the original operating circuit of relay 300, which is the shunt circuit of relay 303. Relay 303 at its contacts 306 transfers the pulling circuit which extends over contacts 244 of relay 240 from the first counting chain relay 215 to the seventh counting chain relay 245 to prepare an operating circuit for relay 245.

With receipt of the eighth pulse, relays 220 and 205 are operated in the manner previously described. The following chart summarizes the operation of the chain with the receipt of further impulses.

| Pulse | Relays Operate | Relays Release |
| --- | --- | --- |
| Ninth | 225, 200 | 220, 205 |
| Tenth | 230, 210 | 225, 200 |
| Eleventh | 235, 205 | 230, 210 |
| Twelfth | 240, 200 | 235, 205 |
| Thirteenth | 245, 210 | 240, 206 |
| Fourteenth | 250, 205 | 245, 210 |
| Fifteenth | 255, 200 | 250, 205 |
| Sixteenth | 260, 210 | 255, 200 |

In the event that a seventeenth pulse is received, receiving relay 680 operates and completes a circuit for lockout relay 336, which circuit extends from positive battery over contacts 681, 391, 388, 204, 208, 212, and 264 and over the winding of relay 336 to negative battery.

Relay 336 operates and at its contacts 337 locks over an obvious circuit to effect reset of the system as will be more fully described hereinafter.

As noted above holding potential for the counting chain at the control office is applied to hold conductor 369 during the receipt of the impulses, the ground being supplied over several different paths in accordance with the nature of the system operation. Briefly, it should be noted that when the control station is sending, relay 350 is operated, and positive potential is applied over contacts 351 to the hold conductor 369. At the end of sending, relay 360 restores to open the circuits of relay 350 and 340 simultaneously. Relay 350 releases immediately, removing positive potential from lead 369. Relay 340 being of the slow release sleeved and slugged type, releases an appreciable interval thereafter. Accordingly, break contacts 343 do not reclose until the counting chain has had a chance to release. Thus even if receiving relays 380 and 384 are operated to extend positive battery in the direction of the counting chain hold conductor 369, contacts 343 are open to permit restoration of the counting chain. An analogous situation holds at the substation.

Assuming a control operation (initiated by the control station), positive potential obtains on lead 369 at the control station as follows:

(1) While the control station is sending the group selection code, positive potential is applied over contacts 351 of relay 350 to hold conductor 369, and is removed at the end of sending by the release of relay 350.

(2) When the control station is receiving the group check code, positive potential is applied to hold conductor 369 over contacts 662, make contacts of relays 380 and 384 in parallel, and break contacts 343 of relay 340. Shortly after receipt of the group check code, relay 660 operates to remove this potential.

(3) While the control station is sending the point selection code, positive potential is applied over contacts 351 to hold conductor 369 and is removed at the end of sending. Point selection code relay 640 operates responsive to receipt of the last pulse to prepare the substation holding circuit.

(4) While the control station is receiving the point check code, positive potential is applied over contacts 643, 632, make contacts of relays 380 and 384 in parallel and contacts 343 to hold conductor 369. Shortly after receipt of the group check code, relay 630 operates, disconnecting the positive potential which was applied over contacts 643 to the hold conductor 369.

(5) While the control station is sending the control code, positive potential is applied over contacts 351 to hold conductor 369, and is removed at the end of sending. Incident to sending the last pulse of the control code, relay 610 operates.

(6) While the control station is receiving the indication code (otherwise called the supervision code), positive potential is applied over contacts 519, 629, 615, contacts $a$ of relays 380 and 384 in parallel, and contacts 343 to hold conductor 369. After the indication has been registered at the control station, relay 515 operates and at contacts 519 removes the positive potential applied over such circuit.

Assuming an automatic reporting from the substation, positive potential is applied to hold conductor 369 at the control station as follows:

(1) While the control station is receiving the group selection code, positive potential is applied to hold conductor 369 over contacts 662, contacts of relays 380 and 384, and contacts 343. Shortly after receipt of the group selection code relay 660 operates and at contacts 662 removes positive potential from conductor 369.

(2) While the control station is sending the group check code, positive potential is applied over contacts 351 to hold conductor 369. At the end of sending relay 350 restores to open contacts 351 and remove this potential. Incident to sending the last pulse of the group check code, relay 650 operates.

(3) While the control station is receiving the point selection code, positive potential is applied over contacts 644, 653, 632, contacts of relays 380 and 384, and contacts 343 to hold conductor 369. Shortly after receipt of the point selection code relay 630 operates, and at contacts 632 interrupts the application of positive potential thereto.

(4) While the control station is sending the point check code, positive potential is applied over contacts 351 to hold conductor 369, and is removed at the end of sending. Incident to sending the last pulse of the point check code relay 624 operates.

(5) While the control station is receiving the indication code, positive potential is applied over contacts 519, 629, contacts of relays 380 and 384 in parallel, and contacts 343 to hold conductor 369. Shortly after receipt of the indication code, relay 515 operates and at contacts 517 disconnects the positive potential from hold conductor 369.

At the substation, holding potential is provided for the counting chain over holding conductor 1304. Assuming a control operation (initiated by the control station), positive potential is provided for hold conductor 1304 as follows:

(1) While the substation is receiving the group selection code, positive potential is applied over contacts 1033, make contacts of relays 830 and 835, and contacts 814 and 809 to hold conductor 1304. Shortly after receipt of the group selection code, relay 1030 operates to disconnect this potential from hold conductor 1304.

(2) While the substation is sending the group check code, positive potential is applied over contacts 816 and 809 to hold conductor 1304, and is removed at the end of sending by opening of contacts 816 with the release of relay 815. Group check relay 1070 operates with sending of the last pulse of the group check group.

(3) While the substation is receiving the point selection code, positive potential is applied over contacts 1063, 1074, 1055, contacts in parallel of relays 830 and 835, contacts 814 and 809 to hold conductor 1304. Shortly after receipt of the point selection code, relay 1050 operates and at contacts 1055 interrupts application of potential thereto.

(4) While the substation is sending the point check code, positive potential is applied over contacts 816 and 809 to hold conductor 1304. Such potential is removed with the release of relay 815 and opening of contacts 816 at the end of sending. Point check relay 1040 operates with sending of the last pulse of the point check code.

(5) While the substation is receiving the control code, positive potential is applied over contacts 1023, 1042, 1031, contacts $a$ in parallel of relays 830 and 835, and contacts 814 and 809 to hold conductor 1304. Shortly after the controlled device has changed its position, relay 1020 at its contacts 1023 operates to disconnect this potential.

(6) While the substation is sending the indication code, positive potential is applied over contacts 816 and 809 to holding conductor 1304. At the end of sending of the code, this potential is removed by the opening of contacts 811 with the release of relay 815. Supervisory code relay 1020 operates incident to transmission of the last pulse of the indication code.

(7) If subsequent control codes are received while standing on a point, positive potential is applied over contacts 1024, contacts $a'$, $b'$, in parallel of relays 830 and 835, and contacts 814 and 809 to holding conductor 1304.

Assuming that the substation has initiated automatic reporting, positive potential is connected to holding conductor 1304 as follows:

(1) While the substation is sending the group selection code, positive potential is applied over contacts 816 and 809 to holding conductor 1304.

(2) While the substation is receiving this group check code, positive potential is applied over contacts 1033, contacts $a'$, $b'$ of relays 830 and 835, and contacts 814 and 809 to holding conductor 1304. Shortly after receipt of the group check code, relay 1080 operates and at its contacts 1033 removes positive potential therefrom.

(3) While the substation is sending the point selection code, positive potential is applied over contacts 816 and 809 to holding conductor 1304, which potential is removed by the opening of contacts 816 with the release of relay 815 subsequent to sending of the code. Point stop relay 1060 operates as the last pulse of the point selection code is transmitted.

(4) While the substation is receiving the point check code, positive potential is applied over contacts 1064, 1055, contacts $a$, $b$ of relays 830 and 835, and contacts 814 and 809 to hold conductor 1304. Shortly after receipt of the point check code, relay 1050 operates and at its contacts 1055 disconnects this potential from the hold conductor.

(5) While the substation is sending the indication code, positive potential is applied over contacts 816 to conductor 1304. As the last pulse of indication code is transmitted, relay 47 operates.

The specific manner in which the complex code circuit is operative with such system is now set forth hereat.

II. *Operation of Complex Code Circuits*

1. SENDING FROM CONTROL STATION; RECEIVING AT SUBSTATION

When the dispatcher at the control station operates a point selection key, such as key 120, to select point 12 of the system, sending relay 360 operates over the circuit traced in the aforesaid patents.

Sending control relay 360 at its contacts 362 extends its operating potential to the complex code unit over break contacts 684, terminal C8, contacts K2–$a$, K1–$a$, K6–$b$, terminal C7, contacts 604, and the winding of transmitting relay 665 to negative potential. As noted previously herein the contacts of the complex code circuit in the present disclosure are thus inserted in series with the operating circuit for the control station impulse sending relay 665.

Relay 665 operates to connect positive and negative potential to the line 85, 86, to in turn pulse line relays 680 and 1000 in parallel as described hereinbefore.

Line relay 680 operates and at its contacts 684 interrupts the circuit of transmitting relay 665. After an interval as determined by its slow release characteristics, relay 665 releases, in turn removing the positive and negative potentials from the line 85, 86 to release line relays 680 and 1000. The circuit of relay 665 is thus re-completed, and the "self-pumping" of relays 665 and 680 continues until stopped by cooperating circuits in the control station.

Assuming that point 12 is to be selected (that is, the second point in the second group), the control station sends six preliminary pulses (with the two pauses interspaced) followed by two group selection pulses, and the substation then returns two group check pulses. Then the control station sends two point selection pulses, and the substation returns two point check pulses, etc. The manner of operation of the complex code unit to introduce a delayed pause between the second and third pulses of the set of six preliminary pulses is now set forth. Specifically, as the counting chain at the control station advances to operate the second counting chain relay 220 following transmission of the first two preliminary pulses, relay K1 of the complex code unit is operated over the path extending from negative potential, over the winding of relay K1, contacts K3–$b$, terminal C2, conductor 2, cable, conductor 2, contacts 222, 226, 231, 236, 241, 246, 251, 256, 261, contacts 372 (relay 370 being non-operated during sending), and contacts 331 (relay 326 being operated as a result of the control station being the station to initiate the operation), to positive potential.

Complex code relay K1 operates and at its contacts K1–$a$ interrupts the circuit for control station impulse sending relay 665; at its contacts K1–$b$ prepares a circuit for complex code relay K6, and at its contacts K1–$d$ prepares a circuit for complex code relay K3.

As line relay 680 releases at the end of the second pulse to close contacts 684, an operating circuit is completed for complex code relay K6 which extends from negative potential over the winding of relay K6, contacts K1–$b$, K2–$a$, terminal C3, and contacts 684, 362, 374 to positive potential.

Relay K6 operates and at its contacts K6–$b$ further interrupts the circuit of transmitting relay 665; and at its contacts K6–$a$ completes a circuit for complex code relay K3 which extends from negative potential over the winding of relay K3, contacts K1–$d$, K2–$c$, K6–$a$, to positive potential.

Relay K3 operates and at its contacts K3–$a$ locks independent of relays K1 and K6, and at its contacts K3–$b$, interrupts the energizing circuit for relay K1 to restore same.

Relay K1 in releasing opens contacts K1–$b$ and the circuit for relay K6, which releases after an interval as determined by its slow release slugged and sleeved construction. This slow release of relay K6 is a basic factor in the provision of a pause between the second and third pulses. As relay K6 releases to close contacts K6–$b$, the original energizing circuit for transmitting relay 665 is recompleted. Impulse sender relay 665 reoperates to reestablish the pumping circuit with line relay 680 and thereby send additional pulses over the line channel 85, 86. As the counting chain advances to the fourth counting chain relay 230 the complex code circuit is again seized to intersperse a delayed pause between the fourth and fifth impulses. As the fourth counting chain relay 230 operates, it is effective at its contacts 232 to complete an energizing circuit for relay K2 in the complex code unit, the circuit extending from negative battery over the winding of relay K2, contacts K4–b, terminal C4, conductor 4, cable, conductor 4, and contacts 232, 236, 241, 246, 251, 256, 261, 372, 331, to positive potential.

Complex code relay K2 operates and at its contacts K2–a further opens the circuit of relay 655, (previously opened at contacts 684) and at its contacts K2–b prepares a circuit to relay K6, and at its contacts K2–d prepares a circuit for relay K4.

As control station line relay 680 releases at the end of the fourth pulse, contacts 684 are closed to complete an energizing circuit for complex code relay K6 which extends from negative potential over the winding of relay K6, contacts K2–b, terminal C8, contacts 684, 362, 374, to positive potential.

Relay K6 operates and at its contacts K6–a completes an energizing circuit for relay K4 which extends from positive potential over the winding of relay K4 and contacts K2–d, and K6–a, to negative potential.

Relay K4 operates and at its contacts K4–a locks independent of relays K2 and K6, and at its contacts K4–b, interrupts the original energizing circuit for relays K2 to restore same.

Relay K2 in releasing opens contacts K2–b and the circuit of relay K6, which releases after a time interval determined by its slow to release characteristics, which interval is an essential factor in the determination of the length of the pause between the fourth and fifth pulses.

As relay K6 releases, the originally traced circuit to transmitting relay 665 is recompleted and relay 665 reoperates to reestablish the self-pumping circuit for relays 665 and 680 and thereby the impulse transmission between the stations. With reestablishment of the impulse transmission the fifth and sixth pulses (which completes the preliminary range) are transmitted followed immediately by the two group selection pulses. As described hereinbefore the advance of the counting chain is terminated after the sixth pulse and a new cycle of the chain is initiated. The two group selection pulses therefore result in advancement of the counting chain to the second relay 220. Since relay K3 in the complex code unit is locked in the operated condition over contacts K3–a, contacts K3–b are open and relay K1 does not operate as before with advancement thereof to the second relay 220. It is apparent that if the group selection code had been such as to run the chain up to or beyond the fourth counting chain relay, (i.e. group 40–90), the operated condition of complex code relay K4 and its open contacts K4–b would prevent operation of relay K2 in the manner effected during the transmission of the preliminary impulse set. Thus a pause is introduced between the second and third pulses and another pause between the fourth and fifth pulses of the preliminary range pulses only.

As a result of such transmission the substation receives a set of six preliminary range pulses, followed immediately by two group selection pulses, the preliminary range pulses including a specially timed delay pause between the second and third pulses and another such pause between the fourth and fifth pulses. The response of the substation equipment to such pulses is now set forth hereat.

As the second counting chain relay 920 at the substation operates as a result of receipt of the first two preliminary range pulses, an operating circuit is completed for substation complex code relay K1 which extends from negative potential over the winding of relay K1, contacts K3-B, terminal 2, conductor 2, cable, conductor 2, and contacts 923, 929, 934, 939, 944, 949, 954, 959, 964, 827, to positive potential.

As line relay 1000 releases, contacts 1001 open the circuit of slow to release relay 835. Normally relay 835 does not release between pulses, but due to the pause introduced by the control station complex code unit between the second and third pulses, line relay 1000 remains non-operated long enough to allow relay 835 to release. The release of relay 835 establishes an operating circuit for complex code relay K5', which circuit extends from negative potential over the winding of relay K5', terminal S6, contacts 856, 839, 833 and 837 to positive battery.

Relay K5' operates, and at its contacts K5'–a provides a holding circuit for relay K1' over the path which extends from positive potential over contacts K5'–a, K1'–e, and the winding of relay K1' to negative potential; at its contacts K5'–b prepares a circuit for reset control relay 845 which will be discussed hereinafter; at its contacts K5'–c opens the circuit of the slugged and sleeved slow release timing relay K7'; at its contacts K5'–d operates relay K3' over the path which extends from positive potential over contacts K5–d, K2'–e, K1'–d, and the winding of relay K3' to negative potential; and at its contacts K5'–d also prepares a circuit for reset control relay 845.

Relay K3' operates and locks over contacts K3'–a and an obvious circuit; and at its contacts K3'–b opens the original operating path for relay K1'; at its contacts K3'–d opens the conductor 3 circuit from the counting chain to reset relay 845, so that the subsequent stepping of the chain will not operate relay 845; and at its contacts K3'–c connects reset relay 845 to conductor 5 circuit from the counting chain. As the pause is now terminated and the third pulse started, relay 835 reoperates and at its contacts 837 opens the energizing circuit for relay K5' to restore same before relay K7' release, the release of relay K5' effecting closure of contacts K5'–c and reestablishing the energizing circuit of relay K7.

As the third and fourth pulses are received, the counting chain advances in the manner as heretofore described.

As the fourth pulse is received, counting chain relay 930 is operated and a circuit is completed for complex code relay K2' which extends from negative battery over the winding of relay K2, contacts K4–b, terminal S4, conductor 4, cable, conductor 4, and contacts 933, 939, 944, 949, 954, 959, 964, 827, to positive potential.

Relay K2' operates and at its contacts K2'–f prepares a circuit for relay K4'; and at its contacts K2'–g prepares a self-holding circuit.

During the delayed pause following the fourth pulse, receiving control relay 835 releases, and at its contacts 837 completes an operating circuit for relay K5 which extends from negative potential over the winding of relay K5, and contacts S6, 854, 839', 833, 837, to positive potential.

Relay K5' operates and at its contacts K5'–a completes the aforementioned holding circuit for relay K2'; at its contacts K5'–c opens the energizing circuit of slow release timing relay K7'; and at its contacts K5'–d completes an operating circuit for relay K4' which extends from negative potential over the winding of relay K4 and contacts K2'–f and K5–d to positive potential.

Relay K4' operates and at its contacts K4'–a locks over an obvious circuit to positive potential; at its contacts K4'–b opens the original energizing circuit of relay K2', and at its contacts K2–c opens the circuit from counting chain lead 5 to reset control relay 845, so that a subsequent operation of the fifth counting chain relay 935 will not operate reset control relay 845.

Upon receipt of the fifth pulse, relay 835 reoperates, and at its contacts 837 effects restoration of relay K5', which restores and at its contacts K5'–a releases relay K2, and at its contacts K5'–c reestablishes the energizing circuit of relay K7 (which will not have released if the pause is of the preassigned delay value).

The fifth and sixth pulses followed immediately by the two group selection pulses are now received. With receipt of the sixth pulse, the counting chain is advanced to the sixth chain relay 945, and relay 855 operates to direct the next pulse to the first counting chain relay, so that the two group selection pulses advance the chain in a new cycle. Thus as the second group pulse is received, the second counting chain relay 920 will be operated. With relay K3' operated and locked, however, contacts K3'–b are open and positive potential on conductor 2 from the counting chain is prevented from operating relay K1.

Also with recycling protection relay 855 operated, contacts 854 are open and relay K5' is prevented from operating with the subsequent release of relay 835 at the end of receipt of the pulses.

If the group selection code had been such as to run the chain up to or beyond the fourth counting chain relay, open contacts K4'–b on relay K4' prevent positive potential on conductor 4 from reaching relay K2'.

Thus the complex code unit operated in response to the receipt of a properly timed pause which was introduced at the control station between the second and third pulses, and again between the fourth and fifth pulses of the preliminary range pulses only.

With relays K3, K4, K3', and K4' locked until reset, no special delay pauses between pulses are sent or received in the subsequent transmissions between the stations.

2. SENDING FROM SUBSTATION; RECEIVING AT CONTROL STATION

When the substation indicates an automatic reporting as a result of the changing position of a controlled device at point 12, such as circuit breaker 1289 (shown in the aforesaid patent), the opening or closing of auxiliary contacts, such as 1291, of the circuit breaker control relay 1235 to release or operate, in turn effecting release of relay 1270. As relay 1270 restores, relays, such as 1194, 875, and 880, operate substation sending relay 820, the detailed circuitry for such operation having been set forth in detail in the aforesaid patent. Such circuit is schematically shown herein as extending from positive potential over the break contacts 826 of receiving relay 825, and the winding of relay 820 to negative potential.

Relay 820 operates and at its contacts 822 completes the operating circuit for transmitting relay 1010, the circuit extending from negative potential over the winding of transmitting relay 1010, contacts 846, terminal S7, contacts K6'–b, K1'–b, K2'–c, terminal S8, and contacts 1004, 822, to positive potential.

As noted heretofore, the contacts of the complex code circuit have been inserted in series with the starting circuit for the transmitting relay 1010 at the substation.

Relay 1010 operates and at its contacts 1013, 1014 connects positive and negative potential to the line channel 85, 86 operating line relays 1000 and 680 in parallel as described hereinbefore.

Line relay 1000 operates and at its contacts 1004 interrupts the circuit of transmitting relay 1010. After an interval as determined by its slow release characteristics, relay 1010 releases, in turn removing the positive and negative potentials from the line channel 85, 86 and releasing line relays 1000 and 680. The circuit of relay 1010 is thus recompleted, and the self-pumping of relays 1010 and 1000 continues until stopped by cooperating circuitry in the control station.

Assuming that point 12 is reporting, (the second point in the second group), the substation sends six preliminary pulses (with the predetermined delay pauses) followed by two group selection pulses and the control station then returns the two group check pulses. The substation in turn sends two point selection pulses, and the control station returns the two point check pulses.

The operation of the complex code circuit is identical to that already described except that the complex code circuit at the substation creates the pauses, and the complex code unit at the control station tests for receipt of the pauses. The reset circuits activated via terminals S1 of the complex code at the substation are discussed in detail hereinafter.

III. Receipt of Transients in the Preliminary Range

In the following description, consideration is given to the reception of transients through the preliminary range at the substation, it being understood that a similar operation occurs at the control station up to the point of operation at which positive potential is connected to terminal S1 of the complex code unit for reset.

1. RECEIPT OF ONE TRANSIENT

A. *Transient too short to operate line relay.*—If a transient is received over the line and is of too short duration to operate line relay 1000 to close contacts 1001, the system is not affected. Even if contacts 1002 momentarily open, relay 840 is of the slow to release type and does not release.

B. *Transient long enough to operate line relay, but not counting chain relay.*—If a transient is received over the line which is of a duration long enough to operate line relay 1000 to the point of closing its contacts 1001, but for so short a duration as to not operate counting chain relay 915, the system is not affected. Upon cessation of the transient, contacts 1001 open and contacts 1002 close to return the relay to its normal position.

C. *Transient long enough to operate counting chain relay but not sequence relay.*—If a transient is received over the line which is of a duration long enough to cause relay 1000 to close its contacts 1001 for a period sufficient to operate the counting chain relay 915, as the transient ends, the relay 915 tries to lock in series with sequence relay 910. The transient may be of such a duration that receiving relay 835, which is energized over contacts 1001, cannot close its contacts. In such event, there is no holding ground on holding conductor 1304 and relay 910 cannot operate. Thus as line relay 1000 restores and opens its contacts 1001, counting chain 915 releases to restore the system to normal.

D. *Transient long enough to operate relay 835 and first sequence relay 910, but not relay 830.*—If a transient is received over the line which is of a duration long enough to cause receiving relay 835 to close its contacts 835–b', and hold gorund as provided for switching conductor 1304. Thus with the restoration of the line relay 1000 following the receipt of the transient, sequence relay 910 will lock in series with counting chain relay 915. However, if the transient is of insufficient duration line relay 1000 may release relay 835 (and in turn sequence relay 910) before relay 830 can operate over contacts 911 of sequence relay 910. The release of relays 1000, 835, 910, and 915 returns the system to normal.

E. *Transient long enough to operate sequence relay 910 and control relay 830.*—If a transient is received over the line which is of long enough duration to operate control relay 830, reset occurs. Briefly, line relay 1000 closes its contacts 1001 to complete operating circuits for relays 915 and 835. At the conclusion of the transient, line relay 1000 releases, removing the shunt from relay 910 which operates in series with relay 915 over contacts 835–b'. Relay 910 operates to close contacts 911 and thereby complete a circuit for relay 830. Relay 830 operates and closes a locking circuit for itself over contacts 831 and 911, and provides a holding ground for relays 915 and 910 in series. Shortly after the cessation of the transient, as determined by its slow to release characteristics, relay 835 releases, opening its contacts 835–b'. However, relay 830 at its contacts 830–a' holds relay 915 and 910 operated when relay 835 opens contacts 835–b'.

When relay 835 releases with relay 830 operated, an operating circuit is completed for relay K5' of the complex code circuit which extends from negative battery over the winding of relay K5′, terminal 6, and contacts 856, 839, 833, 837, to positive potential.

Relay K5 operates and completes a circuit for reset control relay 845 which extends from negative battery over the winding of relay 845, contacts 835–B, 870–A, A–wiring, contacts K5–B, K1′–C, K2′–C, K5′–D, to positive battery. A discussion of reset follows hereinafter.

2. RECEIPT OF TWO PULSES

A. *Sub-standard interpulse pause.*—If two pulses separated by a sub-standard inter-pulse pause are received over the line, the first pulse effects operation of line relay 1000, which in turn operates relays 915 and 835. The pause after the first pulse results in the operation of relay 910 in series with 915 and the consequent operation of relay 830. With the receipt of the second pulse line relay 1000 operates and in turn operates second counting chain relay 920. When relay 1000 first operated, it was effective at contacts 1002 to open the circuit of reset relay 840. When relay 1000 released for the sub-standard pulse, circuit is closed briefly for relay 840, but since the relay is of the slugged and sleeved type, the momentary circuit is of little effect. In its second operation, time relay 1000 again effects opening of the circuit for relay 840, and the second pulse extends the open condition of the circuit for relay 840 for a period to effect release of relay 840 and reset of the system.

B. *Standard interpulse pause.*—If two pulses separated by a standard interpulse pause are received over the line, the second counting chain relay 920 operates responsive to receipt of the second pulse, and in turn effects operation of complex code relay K1′ over the path which extends from negative battery over the winding of relay K1′, contacts K3′–B, terminal 2, conductor 2, cable, conductor 2, and contacts 923, 929, 934, 939, 944, 949, 954, 959, 964, 827, to positive battery. When relay 835 releases during the delayed pause interval after receipt of the two pulses, an operating circuit is completed for relay K5′ over the path which extends from negative potential over the winding of relay K5, terminal 6, and contacts 856, 839, 833, 837 to positive potential. Relay K5′ operates and at contacts K5′–c opens the circuit of relay K7′, and at contacts K5′–d operates relay K3′. Relay K3′ operates and at its contacts K3′–A locks to positive battery. As no further pulses are forthcoming, the release time of relay K7′ is exceeded, and relay K7′ releases to close a circuit at its contacts K7′–a to reset control relay 845, the circuit extending from negative battery over the winding of relay 845, contacts 835–b, 870–a, terminal 1, A–wiring, and contacts K7′–A, K5′–D, to positive battery.

C. *Abnormally long interpulse pause-reverts to LE above.*—If two pulses are received with an abnormally long interpulse pause, they look like two single pulses to the system and the response of the system is as outlined in 1B above, the system resetting on each pulse if the interpulse pause is long enough. If the interpulse pause is long enough to initiate reset as a result of the first pulse, but not long enough for reset to be completed before the second pulse arrives only that portion of the pulse persisting beyond the reset signal is received and is treated as outlined in "1" above.

3. RECEIPT OF THREE PULSES

A. *Sub-standard interpulse pause between second and third pulses.*—If two pulses including the correct interpulse pause between first and second pulses are received, and additionally a third pulse is received separated from the second pulse by a sub-standard interpulse pause, the second and third pulses separated by the sub-standard pulse result in the release of reset relay 840 in the manner described in section 2A.

B. *Standard interpulse pause between second and third pulses.*—If three pulses are received over the line including the standard interpulse pauses between first and second pulses and between the second and third pulses, relay K1′ operates over conductor 2 from counting chain relay 920 following receipt of the first two pulses. Relay K1′ at its contacts K1′–d prepares a circuit for relay K3′. As the standard pulse between the second and third pulses is too short to allow relay 835 to release, relay K5′ does not operate. Accordingly relay K3′ does not operate, and as the counting chain advances to relay 925 as a result of the third pulse, the complex code unit recognizes the incoming code as incorrect and effects operation of the reset control relay 845 over the path which extends from negative battery over the winding of relay 845, contacts 835–b, 870–a, terminal 1, A–wiring, break contacts K3′–d of relay K3′, terminal 3, cable conductor 3, conductor 3, and contacts 529, 934, 939, 944, 949, 954, 959, 964, 827, to positive battery.

C. *Correct length prolonged pause between second and third pulses.*—However, if a standard pause is received between the first and second pulses, and the correct length prolonged pause is received between the second and third pulses, relay K1′ operates over conductor 2 and contacts 923 of the second counting chain relay. As a result of receipt of the correct length prolonged pause between the second and third pulses, relay 835 releases and relay K5′ operates in turn operating relay K3′ and opening the circuit of relay K7′. Accordingly when counting chain relay 925 operates as a result of the third pulse, contacts K3′–d are open and the operating potential extends over contacts 929 and conductor 3 by the third counting chain relay 925 cannot get through to operate reset relay 845. If no pulses follow the third, the release time of relay K7 is exceeded and relay K7 releases. Relay 845 then operates over the circuit which extends from positive potential over contacts K5′–d, K7′–a, A–wiring, terminal S1, contacts 870–a, 835–b, and the winding of reset relay 845 to negative battery.

D. *Abnormally long pause between second and third pulses—reverts to 2B and 1C above.*—If an abnormally long pause is received between the second and third pulses, the received signals appear to the system as two pulses and subsequently a single pulse, and respond in the manner set forth in 2B and then 1E.

4. RECEIPT OF FOUR PULSES

A. *Sub-standard inter-pulse pause between third and fourth pulses.*—Assuming that a normal code is received over the line up to and including the receipt of four pulses except that the pulse received between the third and fourth pulses is substandard, the third and fourth pulses separated by the sub-standard inter-pulse pause simulate the long reset signal resulting in the release of reset relay 51 to effect reset.

B. *Standard pause between third and fourth pulses.*—Assuming that a normal code is received up to and including four pulses, relay K1′ operates as the second pulse advances the chain to the second relay 920 to place ground over contacts 923 and conductor 2 thereto. As a result of the prolonged pause between the second and third pulses, relay K5′ operates, in turn operating relay K3′ which locks. Upon receipt of the third pulse, the third counting chain relay 925 extends positive potential over contacts 827, 964, 959, 954, 949, 944, 939, 934, 929, conductor 3, cable conductor 3, to break contacts K3′–d, but relay K3′ has opened these contacts as a result of the correct length elongated pause between the second and third pulses, so that reset relay 845 does not operate.

Upon receipt of the fourth pulse, relay K2′ operates over the path from positive, contacts 827, 964, 959, 954, 949, 944, 939, 933, conductor 4, cable conductor 4, terminal 4, contacts K4′–b, and the winding of relay K2′ to negative potential.

Following receipt of the fourth pulse, (the last pulse) reset relay 835 releases in turn operating relay K5′. Relay K5' operates relay K4' which locks. Relay K5' also opens the operating circuit of relay K7' which releases after an interval, operating reset control relay 845 which locks over its contacts 949 to positive potential.

C. *Abnormally long pause between third and fourth pulses.*—Assuming a normal code received up to and including the third pulse, the second counting chain relay 920 at contacts 928 operates relay K1' responsive to receipt of the second pulse; relays K5' and K3' operate as a result of the correct length pause between the second and third pulses; and open contacts K1'-c prevent relay 845 from operating. As relay 835 operates responsive to receipt of the third pulse, relay K5' restores to reenergize relay K7' and release K1'. Relay K3' remains locked. The operated condition of relay K3' prevents the positive potential supplied to conductor 3 over contacts 929 of the third counting chain relay 925 from operating reset relay 845.

When relay 835 releases as a result of the abnormally long pause between the third and fourth pulses, relay K5' operates, in turn operating relay 845 over the path from negative battery over the winding of relay 845, contacts 835-b, 870-a, A-wiring, and contacts K5'-b, K1'-c, K2'-e, K5'-d, to positive battery. Relay 845 initiates reset, and the subsequent receipt of the fourth pulse is handled according to section 1 above.

5. RECEIPT OF FIVE PULSES

A. *Sub-standard interpulse pause between fourth and fifth pulses.*—If five pulses are received with correct length pauses except a sub-standard interpulse pause between the fourth and fifth pulses, and fourth and fifth pulses separated only by a sub-standard interpulse pause result in the release of reset relay 840 for a period of time sufficient to effect reset.

B. *Standard pause between fourth and fifth pulses.*—If five pulses are received with correct length pauses except that the pause between the fourth and fifth pulses is of standard length rather than sub-standard or correct length prolonged pause, reset occurs. Briefly relay K1' is operated on the second pulse by counting chain relay 920, and during the correct length delay pause between the second and third pulses, relay 835 releases, in turn, operating relay K5' which operates relay K3' which locks.

Relay 835 reoperates on the third pulse, releasing relay K5' and in turn K1'.

On the fourth pulse, counting chain relay 930 operates relay K2.

As the pause between the fourth and fifth pulses is of standard length relay 835 does not release; relay K5' does not operate; and with relay K5' non-operated, the circuit for relay K4' through contacts K2'-d is not completed to ground through contacts K5'-d, and accordingly relay K4 is not operated.

Accordingly on the fifth pulse an operating circuit is completed to reset control relay 845 which extends from negative battery over the winding of relay 845, contacts 835-b, 870-a, terminal 1, A-wiring, contacts K3'-c, contacts K4'-c of non-operated relay K4'; terminal 5, conductor 5, cable, conductor 5, and contacts 938, 944, 949, 954, 959, 964, 827, to positive battery.

C. *Correct length prolonged pause between fourth and fifth pulses.*—If the correct length prolonged pause had been received between the fourth and fifth pulses, relay 835 would have released, relay K5' would have operated in turn operating relay K4'; which locks and at contacts K4'-c prevents operation of relay 845 responsive to receipt of the fifth pulse and the operation of the fifth counting chain relay to place positive battery on conductor 5.

However, when relay 835 releases following the fifth pulse (as no further pulses are received), relay K5' operates, opening the circuit of timing relay K7' which releases after an interval.

When relay K7' releases, reset control relay 845 operates over the circuit from positive through contacts K5-d, K7-a, A-wiring, terminal 1, contacts 870-a, 835-b, and the winding of relay 845 to negative.

D. *Abnormally long pause between fourth and fifth pulses.*—If an abnormally long pause is received between the fourth and fifth pulses, the situation reverts to 4B above for the first four pulses; and the fifth pulse would be handled according to section 1 above.

6. RECEIPT OF SIX PULSES

A. *Sub-standard interpulse pause between fifth and sixth pulses.*—If a sub-standard pulse is received between the fifth and sixth pulses, reset relay 840 is released to provide reset.

B. *Standard pause between fifth and sixth pulses.*—If a standard pause is received between the fifth and sixth pulses, the counting chain advances to the position with the sixth counting chain relay 940 and sequence relay 900 operated in series. Protection relay 850 will be operated and protection relay 855 will be shunted.

As receiving relay 835 releases an interval after the sixth pulse, relay K5' operates over the path from positive, contacts 837, 833, 839, 856, terminal 6, and the winding of relay K5' to negative. Relay K5' operates reset control relay 845 over the path which extends from negative battery over the winding of relay 845, contacts 835-b, 870-a, terminal 1, A-wiring, and contacts K5'-b, K1'-c, K2'-e, K5-d, to positive battery.

C. *Abnormally long pause between fifth and sixth pulses.*—If an abnormally long pause is received between the fifth and sixth pulses, the release of relay 835 occasioned by the long pause operates relay K5' which operates relay 845 over the path just traced.

7. RECEIPT OF SEVEN PULSES

A. *Sub-standard interpulse pause between sixth and seventh pulses.*—If a sixth and seventh pulse are received separated by a sub-standard length pause, reset relay 840 is released to effect reset.

B. *Standard pause between sixth and seventh pulses.*—If the standard pause is received between the sixth and seventh pulses, reset is avoided. Protection relay 850 operates at the end of the sixth pulse, and relay 855 operates at the end of the seventh pulse. When relay 835 releases following the seventh pulse, positive battery through contacts 837, 833, 839, make contacts 857 of operated relay 855, and the windings of group selection control relays 1130 and 1140 in parallel to negative potential operates relays 1130, 1140, which operate and lock over contacts 1136 to positive battery. Thus the preliminary range is exceeded. This case will be dealt with further hereinafter.

C. *Abnormally long pause between sixth and seventh pulses.*—If an abnormally long pause is received between the sixth and seventh pulses, the situation reverts to 6B above for the first six pulses and the seventh pulse is treated thereafter according to section 1 above.

IV. *Receipt of Transients In Excess of the Preliminary Range*

1. RECEIPT OF TRANSIENTS AT BOTH ENDS SIMULTANEOUSLY

Assume the receipt of transients in excess of the preliminary range at both ends simultaneously, which transients successfully simulate the preliminary code plus a group selection code 1, with pulses and pauses of such duration that the incoming code appears to be code for group 1.

At the Substation

The receipt of this code at the substation end, results in the operation of group selection control relays 1130 and 1140 and in turn, group selection relays 1150 and 1160 for group 1 and group code received marking relay 1080.

As a result thereof, the substation proceeds to return a single group check code and waits for a point selection code.

At the Control Station

The receipt of this code at the control station results in the operation of group selection control relays 550 and 560 and, in turn, group selection relays 440 and 450 for "group one" and group code received marking relay 660.

As a result thereof, the control station proceeds to return a single group check code, and waits for a point selection code.

As both ends are in the waiting condition, a stall occurs. The alarm lamp energized for a prolonged period, apprises the attendant at the control station that a stall has occurred.

Release is effected by operation of manual reset key 404 by the attendant at the control station. The control office reset relay 600 is thereby operated and equipment at both stations is restored to normal.

The above system operation has been fully described in the aforementioned patent, and reference is made thereto for the detailed circuitry descriptions.

This same pattern occurs as a result of receipt of from seven to sixteen transient pulses simultaneously by both stations, assuming that pulses and pauses simulate preliminary pulses followed by group selection pulse or pulses, and such pattern is summarized in the second column of the chart titled "Preliminary Range of Six Impulses" at the top of column 77 in Patent No. 2,616,959.

If seventeen or more transient pulses are received simultaneously with pulses and pauses such as to simulate six preliminary pulses followed by eleven pulses, reset and lockout control relay 805 at the substation end are operated by the seventeenth pulse over a path extending from driving ground over positive battery, contacts 913 of sequence relay 910, contacts 961 of the counting chain relay 960 (which is operated on the sixteenth pulse), and the winding of relay 805 to negative. Relay 805 at its make-before-break contacts 806 locks over contacts 842 to direct positive potential, and at its contacts 807 disconnects positive potential from all points bearing symbol ⊕ thus releasing the relays so held at the substation, and thereby placing the substation on lockout until the long reset signal from the control station operates relay 1000 to release reset relay 840 which in turn releases relay 805.

The receipt of these seventeen or more transient pulses by the control station results in reset on the receipt of the seventeenth pulse, control relay 336 being operated over the path which extends from driving ground positive over contacts 212 of sequence relay 210, contacts 264 of counting chain relay 260 (which was operated on the sixteenth pulse), and the winding of relay 336 to negative potential. Lockout relay 336 locks over its contacts 337 and contacts 392 of reset relay 390 to positive potential. Relay 336 at its contacts 339 operates reset control relay 600. Relay 600 at its contacts 603 operates transmitting relay 665 which places positive and negative potentials on the line channel 85, 86 to operate line relays 680 and 1000 at the respective station to effect reset of the system. The operation of relay 680 opens the circuit of reset relay 390, which releases after an interval as determined by its slugged and sleeved slow release period, removing positive potential from all points indicated thus ⊕. Relay 336 is released thereby and in turn releases relay 600 which releases after a period as determined by the slow release slugged and sleeved characteristic, in turn releasing relay 665, which also releases after an interval as determined by its sleeved slow release characteristic, to in turn release line relays 680 and 1000. Thus the long reset signal transmitted by relay 665 effects reset at the control station and substation.

Relay 680 in restoring at its contacts 682 recompletes the circuit to reoperate reset relay 390, which reestablishes positive potential to all points at the control station marked ⊕ through contacts 392. The release of relay 1000 reoperates reset relay 840, which reestablishes positive potential through contacts 842 and 807 to all points at the substation marked thus ⊕.

2. RECEIPT OF TRANSIENTS BY SUBSTATION ONLY

A. *Receipt by substation only of seven transient pulses, correctly spaced.*—If the substation only receives transients beyond the preliminary range with correct length pulses and pauses, say one group selection pulse beyond the preliminary range, for example, so that the received code simulates "group one" selection, the substation proceeds to register the received group 1 selection code as described above, and sends a single group check code pulse to the control station.

The control station receives this as a single transient pulse.

When receiving control relay 386 at the control station releases an interval after cessation of this single pulse, relay K5 operates which extends from positive potential over contacts 386, 383, 386′, terminal 6, and the winding of relay K5 to negative potential.

Relay K5 operates reset control relay 336 over the path which extends from positive potential over contacts K5-d, K2-c, K1-c, K5-b, A-wiring, and the winding of relay 336 to negative.

Relay 336 operates and locks to ⊕ over its contacts 337, and thereupon effects reset of the control station and substation equipment. Briefly, relay 336 at its contacts 337 operates reset control relay 600 over a path indicated as a dotted line herein (and taught specifically in the patent), and the winding of relay 600 to negative. Relay 600 locks over its contacts 602 to ⊕ and at its contacts 603 operates transmitting relay 665. Relay 665 operates to place positive and negative potentials on the line channel 85, 86 to initiate transmission of a long reset signal for the control station and substation equipment. Line relay 680 at the control station and relay 1000 at the substation operate in response thereto, and relay 680 at contacts 682 opens which releases after an interval as determined by its slugged and sleeved characteristics, and at its contacts 392 removes positive potential from all points indicated ⊕ thus releasing any relays held thereby and resetting the control station. Relay 336 releases to open the circuit of slugged and sleeved relay 600 which releases after an interval to in turn open the circuit of sleeved relay 665 which releases after an interval. The release of relay 665 removes positive and negative potentials from the line channel 85, 86, thus terminating the long reset signal. Relay 680 releases in turn reoperating relay 390 which reestablish ⊕ to points so marked.

Substation line relay 1000 at its contacts 1002 opens the circuit for reset relay 840 which releases after an interval as determined by its slugged and sleeved characteristics, and at its contacts 842 opens the circuit from ⊕ through contacts 842 and 807 to all points marked ⊖, thus releasing all substation relays held thereby. When the control station terminates the reset signal by removing positive and negative potential from the line, relay 1000 releases in turn reoperating relay 840 which reestablishes positive potential to all points showing symbol ⊕ by closing contacts 842.

B. *Receipt by substation only of eight transient pulses, correctly spaced.*—If the substation should receive eight transient pulses correctly spaced including the long pauses between the second and third pulses and between the fourth and fifth pulses, the received pulses appear to the substation to be the "group two" selection pulses. The substation responds to the "group two" selection pulses and transmits two group check pulses to the control station.

The control station receives and registers these two pulses. The second counting chain relay 220 at its contacts 222 places positive potential on conductor 2 to operate relay K1'. As relay 384 releases, relay K5 operates in turn operating relay K3 which locks relay K1 over the circuit which extends from positive potential over contacts K5–a, K1–e, and the winding of relay K1 to negative potential.

Relay K5 also opens the circuit of timing relay K7 which releases after an interval. Relay 336 then operates over the circuit which extends from positive potential over contacts K5–d, K7–a, A-wiring, terminal 1, and the winding of relay 336 to negative potential.

Relay 336 effects reset of the control station and substation as heretofore described.

C. *Receipt by substation only of nine transient pulses, correctly spaced.*—If the substation should receive nine transient pulses correctly spaced including the long pauses between the second and third pulses and between the fourth and fifth pulses, the received pulses appear to the substation to be the "group three" selection code. Relays 1130 and 1140; and relays for group 3 (not shown) analogous to relays 1170 and 1180 for group 2 (in the referred to patent) are operated through make contacts 1133 of the referred to patent.

As a result thereof the substation sends three group check pulses with a standard pause between the first and second pulses, and the same length standard pause between the second and third pulses.

The control station receives these three pulses.

The second pulse results in the operation of the second counting chain relay which in turn operates. Inasmuch as a correct length prolonged pause is not received between the second and third pulses, relay K5 and in turn relay K3 do not operate.

Accordingly on the third pulse, positive potential is applied over contacts 227 of the third counting chain relay, conductor 3, cable, conductor 3, unoperated break contacts *d* of relay K3, A-wiring, terminal 1, and the winding of relay 336 to negative potential to operate relay 336 and thereby effect reset of the equipment at both stations.

D. *Receipt of any number of transient pulses, correctly spaced.*—It can be appreciated from what has already been described that for group check codes transmitted by the substation as a result of receipt of any number of transient pulses correctly spaced, the control station will intercept the received group check code as a result of the regular length pause rather than the correct length prolonged pause between the received second and third pulses.

3. RECEIPT OF TRANSIENTS BY CONTROL STATION ONLY

A. *Receipt of seven transient pulses, correctly spaced.*—If the control station alone receives transients beyond the preliminary range with correct length pulses and pauses, as for example, one group selection pulse beyond the preliminary range, the received code appears to be a "group one" selection code, and the control station equipment proceeds to register the received group one selection code, and sends a single group check code pulse to the substation.

The substation receives this single pulse and deals with it as a transient. As relay 835 releases an interval after the cessation of the pulse, relay K5' operates and in turn operates reset control relay 845 over the path which extends from negative potential over the winding of reset control relay 845, contacts 835–b, 870–a, terminal S1, A-wiring, and contacts K5'–b, K1'–c, K2'–e, K5'–d, to positive potential.

Reset control relay 845 locks over its contacts 848 to ⊕, and at its contacts 847 operates transmitting relay 1010, which in turn places positive and negative potentials on the line channel 85, 86 to initiate transmission of the long reset signal for the control station and substation equipment. Receiving relay 680 at the control station and receiving 1000 at the substation operate in response thereto, and relay 680 at its contacts 682 opens the circuit of slugged and sleeved relay 390 which releases after an interval. Relay 390 at its contacts 392 removes positive potential from all points at the control station showing symbol ⊕, thus releasing any relays held operated thereby. Substation relay 1000 at its contacts 1002 opens the circuit of sleeved and slugged reset relay 840 which releases after an interval. Relay 840 at its contacts 842 opens the circuit from ⊛ through contacts 842 and 807 to all points showing the symbol ⊕, thus releasing all relays energized by such potential. Relay 845 releases after an interval, and opens the circuit of sleeved relay 1010, which after an interval releases to terminate the long reset signal on the line. Relays 680 and 1000 responsively release, and reset relays 390 at the control station and 840 at the substation reoperate. Relay 390 restores positive through contacts 392 to all points showing symbol ⊛ at the control station, and relay 840 through its contacts 842 reestablishes the circuit for positive potential to all points showing symbol ⊕ at the substation. The system is now reset.

B. *Receipt of eight transient pulses, correctly spaced.*—If the control station should receive eight transient pulses correctly spaced including the long pauses between the second and third pulses and between the fourth and fifth pulses, the received pulses appear to the control station to be the "group two" selection pulses. The control station responds to the "group two" selection pulses, and transmits two group check pulses to the substation. The substation receives and registers these two pulses, and complex code relay K1 operates as before.

When relay 835 releases an interval after receipt of the two pulses, relay K5' operates, in turn operating relay K3' which locks.

Relay K5' at its contacts K5'–c opens the circuit of slugged and sleeved timing relay K7' which releases after a timed interval as determined by its slugged and sleeved characteristics. The release of relay K7' operates reset control relay 845 over the path which extends from positive potential over contacts K5'–d, K7–a, A-wiring, terminal S1, contacts 870–a, 835–b, and the winding of relay 845 to negative potential.

Relay 845 effects reset of substation and control station as described hereinbefore.

C. *Receipt of nine transient pulses, correctly spaced.*—If the control station should receive nine transient pulses correctly spaced including the long pauses between the second and third pulses and between the fourth and fifth pulses, the received pulses appear to the control station to be the "group three" selection code (assuming group 3 equipped at the control and substation).

Relays 550 and 560 and the relays for group three (not shown, but analogous to relays 420 and 430 for group two) are operated over make contacts 553 of the previously cited patent. As a result thereof the control station sends three group check pulses with a standard pause between the first and second pulses, and the same length standard pause between the second and third pulses. With relay K3 locked, the positive battery placed on conductor 2 by the second counting chain relay 920 is withheld from relay K1 winding at open contacts K3–b so that the prolonging of the pause between the second and third pulses is prevented.

As the substation receives the second pulse of the three pulse group, the second counting chain relay operates complex code relay K1' as before. Inasmuch as a correct length prolonged pause is not received between the second and third pulses, relay K5' and in turn relay K3' do not operate.

Accordingly on the third pulse, reset control relay 845 operates over the circuit extending from negative potential over the winding of reset control relay 845, contacts 835–b, 870–a, terminal 1, A-wiring, unoperated break contacts of relay K3′, conductor 3, cable, conductor 3, through contacts 929 of the third counting chain relay, to positive potential. Relay 845 operates to effect reset of the equipment at both stations.

D. *Receipt of any number of transient pulses, correctly spaced.*—It can be appreciated from what has already been described that for group check codes transmitted by the control station as a result of receipt of any number of transient pulses correctly spaced, the control station will intercept the received group check code as a result of the regular length pause rather than the correct length delay pause between the received second and third pulses.

V. *General Description of Lock-out Circuits*

A special lock-out circuit may be used in conjunction with the complex code circuits to provide even further protection against improper system operation responsive to the occurrence of transients.

In this case with B-wiring, in lieu of the illustrated A-wiring, the line circuit goes through "receiving relay" RR at the control station instead of through line relay 680, and through "receiving relay" RR′ at the substation instead of through line relay 1000.

Also with B-wiring, the circuit of line relay 680 extends from negative potential over B-wiring, the winding of relay 680, B-wiring, terminal 11 into the special lock-out circuit, and over two parallel paths to ⊕, one path extending over break contacts K8–b, terminal 9, and make contacts RR–a to ⊕ when relay RR is operated and relay K8 is released; and the other path extending through contacts K8–d to ⊕ when relay K8 is operated. The circuit of line relay 1000 extends over similar paths at the substation.

Also when the special lockout circuits are used, the circuit for transmitting relay 665 extends over make contacts 603, of relay 600, B-wiring, terminal 13 and through contacts K10–c, to ⊕ when reset relay 600 is operated and relay K10 is released; whereas with A-wiring the circuit from contacts 603 goes directly to ⊕. When relay K10 of the special lockout circuit is operated, the circuit for relay 600 extends through break contacts 338, terminal 12, and make contacts K10–b to ⊕.

At the substation, when the special lockout circuits are used a circuit of the transmitting relay 1010 extends from negative potential over the winding of the transmitting relay 1010, contacts 847, B-wiring, terminal 13 and the break contacts K10–c to ⊕ when reset relay 845 is operated and relay K10 is released; whereas with A-wiring the circuit from contacts 847 goes directly to ⊕. When relay K10 of the special lockout circuit operates, the circuit for reset relay 845 extends through make contacts K10′–b to ⊕.

1. OPERATION DURING NORMAL SIGNALLING

When transmitting relay 665 at the control station or 1010 at the substation places positive and negative potentials on the line wires 86 and 85, both relays RR and RR′ respond in the same way that line relays 680 and 1000 respond when A-wiring is connected.

Whenever control station relay RR operates, it is effective at its contacts RR–a to complete a circuit for line relay 680 which extends from ⊕ over contacts RR–a, terminal 9, break contacts K8–b, terminal 11, B-wiring, the winding of relay 680, and B-wiring to negative potential. Whenever relay RR releases, it in turn releases relay 680.

Substation relay RR′ in its operation is effective at its contacts RR′–a to operate relay 1000 over a path which extends from ⊕ over contacts RR′–a, terminal 9, break contacts K8′–b, terminal 11, B-wiring, the winding of relay 1000, B-wiring to negative potential. Relay RR′ in its release in turn restores relay 1000.

Line relay 680 at its contacts 681, 682, 683, and 684 and line relay 100 at its contacts 1001, 1002, 1003, and 1004, perform the same functions as described hereinbefore.

2. OPERATION UPON RECEIPT OF SIGNAL FROM COMPLEX CODE CIRCUIT

As already described, under various circumstances, the complex code circuit at the control station places positive potential over A-wiring on terminal C1 which operates reset control relay 336; and the complex control circuit at the substation places positive potential through A-wiring on terminal S1 which operates reset control relay 845.

With B-wiring instead of A-wiring at the control station, this positive potential is applied over contacts K8–f, and the winding of relay K8 to negative potential operates to slugged and sleeved slow-release relay K8. Complex code relay K8 operates and locks over contacts K8–e (before contacts K8–f break), and contacts K10–a to ⊕.

At the substation with B-wiring instead of A-wiring, this positive potential is applied over contacts K8′–f to slugged and sleeved slow-release relay K8 which operates and locks over contacts K8′–e (which make before contacts K8′–f open), and contacts K10′–a to ⊕.

A. *Operation of special lockout circuit at the control station.*—Relay K8 at its contacts K8–d completes an operating circuit for relay 680 which extends from direct positive potential ⊕ over terminal 11, B-wiring, winding of relay 680, B-wiring, to negative.

Relay RR may be in the operated or non-operated condition when relay K8 operates depending upon the relative time of receipt of the signal from the complex code unit. For example if the pause was not received between the second and third pulses relay K3 is not locked operated, and K8 is operated while relay RR is still operated, the circuit for relay K8 extending from ground placed on conductor 3 by the counting chain with receipt of the third pulse and over contacts K3–d, B-wiring, K8–f, and the winding of relay K8 to negative potential. In instances in which there is a pause of excessive length following the second pulse, relay K8 is operated over the path which extends from positive potential over contacts K5–d, K7–a, B-wiring, contacts K8–f, and the winding of relay K8 to negative potential. Relay RR, of course, would be non-operated at the time of operation of relay K8.

If relay RR is in the operated condition at the time of operation of relay K8, line relay 680 is held operated over a circuit extending from direct positive potential over contacts RR–a, terminal 9, contacts K8–b, terminal 11, B-wiring, the winding of relay 680 and B-wiring to negative potential. If contacts K8–b should open before contacts K8–d close, relay 680 may momentarily release and reoperate but the flip would be so fast the position of the counting chain would not change. Even though relay Rr may be operated when relay K8 operates, relay RR would release shortly thereafter, but relay 680 would be held.

If relay RR is in the process of releasing when relay K8 is energized, or if relay RR has released, and relay 680 is in the process of releasing, the counting chain sequence relay would operate, but positive potential from the counting chain relay would be maintained on relay K3.

If relay RR is non-operated when relay K3 energizes, the operation of relay K8 operates relay 680, which in turn steps the chain to the next chain relay, but this can be tolerated as reset is imminent.

In any case, the operation of relay K8 operates relay 680 which at contacts 682 opens the circuit of reset relay 390. Relay 390 at its contacts 391 opens the driving circuit to the counting chain, and at its contacts 392 opens the circuit which supplies positive potential to all points at the control station bearing symbol ⊕ releasing all relays so held.

When relay RR releases with relay K8 operated; or when relay K8 operates with relay RR released, ten second slow to operate timing relay K10 energizes over the path which extends from negative battery over the winding of relay K10, contacts K9–a, K8–a, terminal 10, through contacts RR–b, to positive battery.

It is noted that until relay 680 releases, reset relay 390 will be maintained in the released position to withhold ⊕ from all operating circuits thus controlled and thereby holding open the driving circuit to the counting chain open. Moreover, relay 680 is held operated until relay K8 releases; and relay K8 is held locked until relay K10 operates.

Accordingly, the control station is held on lockout until shortly after relay K10 operates. When relay K10 operates, it is effective at its contacts K10–b to complete a circuit for relay 600 which extends from direct positive over contacts K10–b, terminal 12, contacts 388, other contacts illustrated in the cited patent and shown herein as a dotted line, and the winding of relay 600 to negative potential. Relay 600 locks over its contacts 602 to the bus which supplies ⊕ to all points so indicated, which incidentally reenergizes this bus until relay K10 releases. Also, when relay K10 operates, contacts K10–a open the holding circuit for relay K8, and relay K8 releases after an interval as determined by its slow to release characteristics. As relay K8 releases, and contacts K8–f reclosed, the original positive potential through B-wiring thereto will be found removed as a result of the release of relay 390 and the consequent removal of ⊕ from points showing this symbol to release the relays controlled by ⊕. More specifically, if ⊕ through contacts K5–d originally operated relay K8, the removal of ⊕ interrupts such circuit. Also the removal of ⊕ releases relay K5 which further opens the circuit of relay K8.

The release of relay K8 opens the circuit of relays K10 and 680 which release. The release of relay K10 removes direct positive from the winding of slugged and sleeved slow release relay 600, which restores to remove the incidental positive on the bus supplying points showing symbol ⊕, and at contacts 603 completes a circuit to operate relay 665 which will be further considered shortly hereinafter.

The release of relay 680 reoperates relay 390 which at contacts 391 prepares the driving circuit to the counting chain and at contacts 392 connects positive potential to the bus supplying points indicated as ⊕ thus completing local reset at the control station. This reestablishment of potential to the ⊕ supply bus reestablishes the holding circuit of relay 600 which does not release.

As before stated, relay K10 releases and at its contacts K10–c completes an operating circuit for transmitting relay 665, which extends from direct positive potential over contacts K10–c, terminal 13, B-wiring, contacts 603, and the winding of relay 665 to negative potential. Relay 665 operates to place positive and negative potentials on the line channel wires 85, 86 to initiate a long reset signal for the control station and substation equipment. Line relays RR and RR' operate in response thereto and in turn operate relays 680 and 1000, respectively.

Relay 1000 at the substation releases reset relay 840 which at its contacts 843 opens the driving circuit to the counting chain, and at its contacts 842 removes positive potential from the ⊕ supply bus to release any relays held thereby at the substation.

Relay 680 at the control station releases reset relay 390 which at contacts 391 opens the driving circuit to the counting chain; and at contacts 392 removes positive potential from the ⊕ supply bus to open the holding circuit for relay 600.

After an interval as determined by its slow release characteristics, relay 600 releases in turn opening the circuit of slow release relay 665 which releases after an interval. Relay 665 restores to remove the long reset signal from the line, thereby releasing line relays RR and RR' and in turn relays 680 and 1000.

The release of control station line relay 680 reoperates reset relay 390 which prepares the counting chain driving circuit and reconnects positive potential to the ⊕ bus. The release of substation line relay 1000 reoperates reset relay 840 which prepares the counting chain driving circuit and reconnects positive potential to the ⊕ bus.

B. *Operation of the special lockout circuit at the substation.*—The operation of the special lockout circuit at the substation is the same as that described for the control station, analogous relays being involved.

Briefly, relay K8' operates line relay 1000 which releases reset relay 840 to open the counting chain drive circuit and to release any relays holding to the ⊕ bus for local reset purposes. Relay K8' also closes the circuit of reset enabling relay K10' which operates after approximately ten seconds. Relay K10' operates relay 845 in preparation for general reset; and opens the circuit of slow release relay K8'. Relay K8' releases after an interval, in turn releasing relay 1000, which operates relay 840 to prepare the counting chain drive circuit and reestablishes positive potential to the ⊕ bus.

Relay K8' also releases relay K10' which operates transmitting relay 1010 to place positive and negative potentials on the line wires 85, 86 and thereby initiate the long reset signal for the control station and substation equipment. Line receiving relays RR and RR' operate in response thereto and in turn operate relays 680 and 1000, respectively.

At the control station relay 680 releases reset relay 390 which performs its reset functions. At the substation, relay 1000 releases reset relay 840 which performs its reset functions, releasing relay 845. Relay 845 releases relay 1010 which releases line receiving relays RR and RR'.

The release of relays RR and RR' release relays 680 and 1000 respectively. The release of relays 680 and 1000 reoperate reset relays 390 and 840 respectively which complete their reset functions.

During this operation relay 845 incidentally connects positive potential to the ⊕ bus from the time of its operation until relay K10' operates, but any operated relays which held to the ⊕ bus were previously released, and relay 840 is released.

3. OPERATION UPON RECEIPT OF CHANNEL SIGNAL DURING LOCKOUT

Referring to the control station, if a signal is received over the channel during the lockout period, after relay K8 has operated, but before relay K10 has operated, relay RR operates responsive to the signal.

Relay RR at its contacts RR–b opens the operating circuit of relay K10 which releases in several milliseconds, and at its contacts RR–a completes an operating circuit for relay K9 over the path extending from direct positive potential over contacts RR–a, K8–c, and the winding of relay K9 to negative potential, and also over the circuit through resistor R1 and condenser C1 to negative potential to charge condenser C1. As long as relay RR is operated by a signal on the channel, relay K9 is held operated, relay K10 is restored, relay K8 is operated, relay 680 is operated, and relay 390 is restored.

Relay K9 at its contacts K9–a further opens the circuit of relay K10 so that when relay RR releases, the circuit to relay K10 is not recompleted until relay K9 releases. When relay RR does release the initial operating circuit of relay K9 and the charging circuit of condenser C1 are opened. Condenser C1 discharges through the resistor R1 and the winding of relay K9 to retard the release of relay K9. If the condenser has been fully charged, it takes four or five seconds for relay K9 to release. As relay K9 restores, the energizing circuit of relay K10 is reestablished and it once more begins its slow operate period.

Thus every time a signal is received over the channel during the lockout period, the lockout period is interrupted and is reinitiated several seconds after the signal is terminated.

Referring to the substation, a corresponding operation occurs if a signal is received over the channel to operate relay RR' during the lockout period of the special lockout circuit at the substation.

If both stations should transmit the reset signal over the channel simultaneously, no harm is done as the polarities applied to the line wires by relays 665 and 1010 are the same, and the last relay to release disconnects the reset signal from both offices.

This the complex code unit is activated if an abnormal signalling condition occurs; the complex code unit signals the special lockout circuit which resets the local station and places the local end on ten second lockout; and at the end of the lockout period, the special lockout circuit effects the reset of both stations.

4. IMPLICATIONS RELATIVE TO THE RECEIPT OF TRANSIENTS

With the special lockout circuit equipped instead of just resets effected by the complex code units, resets are accompanied by at least ten second lockout and extended lockout if signals appear on the channel during the ten second lockout interval.

Each additional lockout interval prevents false operation by possible transients for at least ten seconds (and more if it occurs during the lockout interval) whenever an abnormal condition is detected. The further requirement for the receipt of a pause between the second and third pulses and again between the fourth and fifth pulses insures against improper operation with the occurrence of even extremely adverse conditions. The feature wherein the occurrence of transients at one end only (even such as may penetrate the maze at one end) results in the transmission of signals without pauses to the other end, and the corresponding reset by the complex code unit thereat results in further desirable protection.

VI. *Reset*

At this point the different reset operations are considered briefly.

Referring to the control station, local reset is initiated by the operation of the complex code unit relay K8 and relay 680, which releases relay 399 to open the driving circuit to the counting chain and removes positive potential from points designated ⊕. This local reset is completed with the release of relay K8 by relay K10, and the consequent release of relay 680 and the reoperation of relay 399.

Similarly, referring to the substation, local reset is accomplished by operation of the complex code unit relay K8 and relay 1000 which releases relay 840 to open the driving circuit to the counting chain and removes positive potential from points designated ⊕. This local reset is completed with the release of relay K8 by relay K10, and the consequent release of relay 1000 and the reoperation of relay 840.

General reset (i.e. reset of both ends) is accomplished by the control station effecting a prolonged operation of transmitting relay 665. Briefly, relay 600 at its contacts 603 with A-wiring operates relay 665 for a prolonged period. With B-wiring, relay 600 must be operated and relay K10 released.

Reset control relay 600 is connected for operation over several circuits. One circuit for relay 600 extends from positive potential over contacts 339 of fast operating relay 336. Another circuit extends from positive potential over the make contacts of group selection control relays 550 and 560 (see previously cited patent). Another circuit extends from positive potential over contacts K10–b, and contacts 388, and a fourth circuit extends from positive potential over contacts 405 of the manually operable reset key.

Fast reset control relay 336 is arranged to be operated from several sources. One circuit extends from driving ground positive over contacts 212 and 264 whenever the pulses succeed in driving beyond the end of the counting chain. A second circuit extends from positive potential over terminal 1 and A-wiring from the complex code unit. Another circuit extends from positive potential over contacts 681, 391, 362, and 341 (see previously cited patent) whenever both control station and substation start sending at the same time, and the code from the substation contains a pulse or pulses beyond the code sent by the control station. That is, after the control station ceases sending its code, relay 360 releases before relay 340, and if a pulse is received at this time relay 680 operates and in turn operates relay 336.

General reset is effected at the substation by effecting prolonged operation of transmitting relay 1010. With A-wiring direct positive potential is extended over contacts 847 of reset control relay 845 to relay 1010. With B-wiring, direct positive potential is applied over contacts K10–c and 847 to relay 1010. With Y-wiring reset control relay 845 is operated by positive potential extended over contacts 961 of the last counting chain relay 960 whenever a pulse is received by the counting chain driving it past the last step of the chain.

Regular lockout of the substation is accomplished by the operation of regular lockout relay 805, which locks over contacts 806 (which break before contacts 807 open) and contacts 842 to direct positive potential. Relay 805 at contacts 807 removes positive potential from points showing symbol ⊕. The substation is thus de-activated until reset relay 840 is released.

Fast operating regular lockout relay 805 can be operated over several different circuits. With X-wiring one of these circuits extends ground over contacts 961 to relay 805. Another circuit extends positive potential over contacts 1002, 843, 823 and 812 (as described in previousely cited patent), and over dotted line Z to relay 805 and negative potential. Such circuit is completed as a result of control station and substation sending simultaneously, wherein the control station sends a code with more pulses than the code sent by the substation. Such circuit is also completed as a result of two or more substations sending simultaneously, wherein one sends a code with more pulses than the other, whereby relay 805 in each of the other substantions is locked out (see description in previously cited patent). Another circuit extends positive potential over the contacts of group selection control relays 1130 and 1140 corresponding to the unequipped groups (as described in the previously cited patent application), and S-wiring to relay 805 and negative potential.

On a locked-out condition defined by relay 805 in the operated condition, the substation is released by a long reset signal from the control station or a sister substation.

VII. *Use With Channel Means Such as Carrier, Radio or Microwave*

The adaptation of the system including the complex code units for cooperation with channel means of a carrier, radio, or microwave type is shown schematically in FIGURE 5.

As there shown, the control and indication devices are operative to control the control station switching equipment in the manner previously set forth in FIGURES 1–4. Relay 680 instead of operating by connection to a two wire metallic line as shown in FIGURES 1–4 being operated in the present arrangement over a circuit extending from negative potential over the winding of relay 680 to direct positive potential in the receiver as indicated by a dotted line. Such circuit is closed and opened in response to pulses and signals received over the channel. Relay 680 performs its usual functions.

Figure 2:
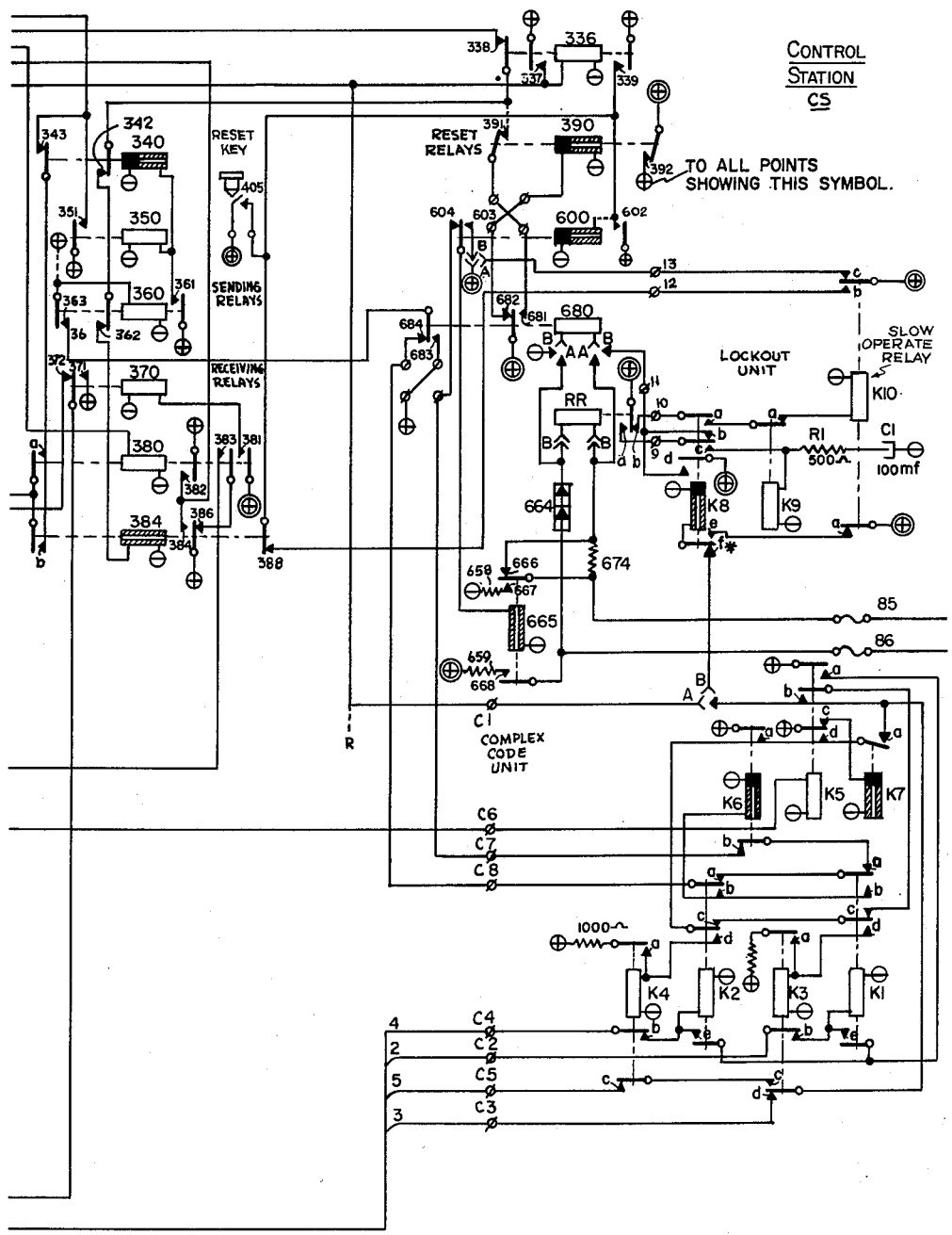
Figure 3:
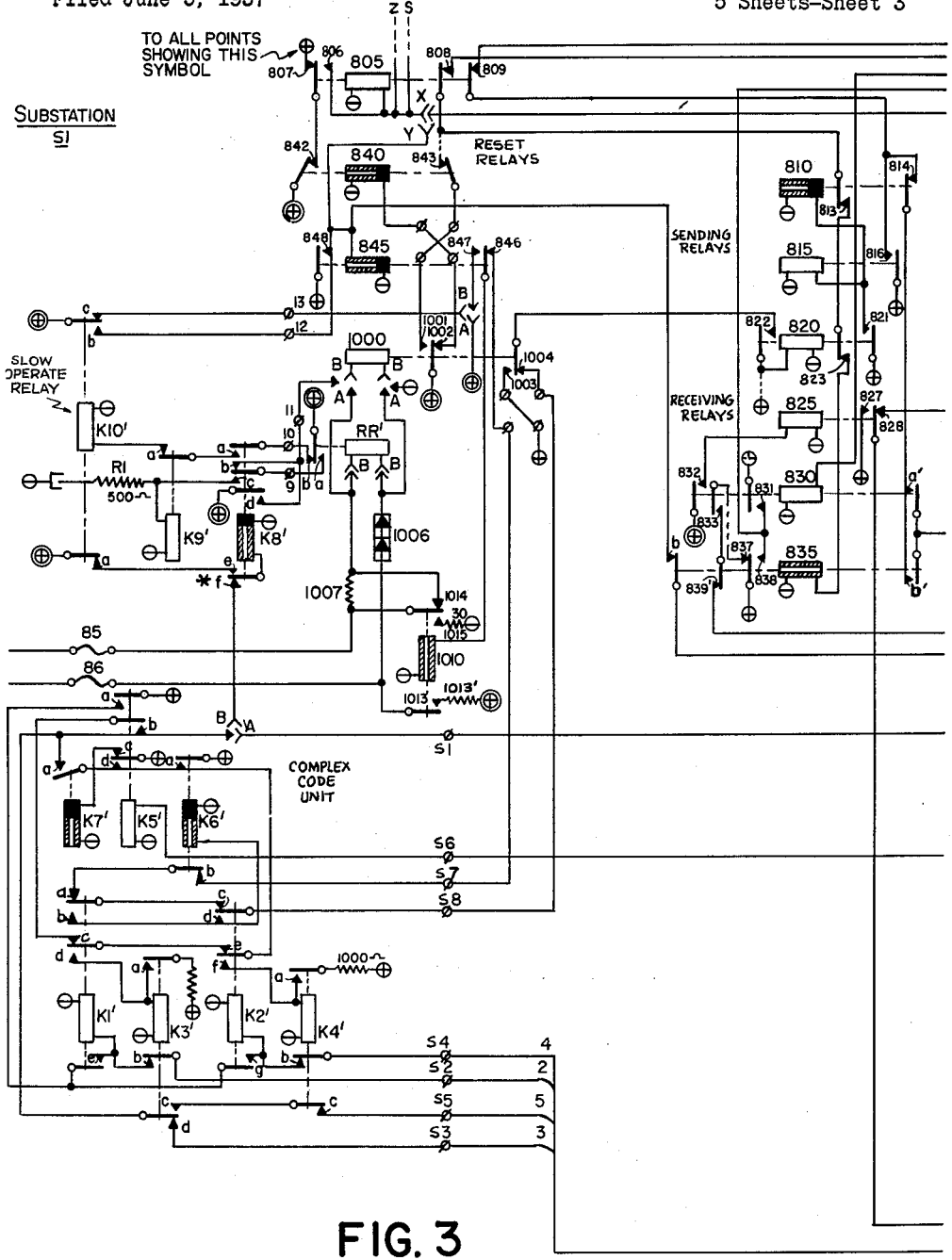
Figure 4:
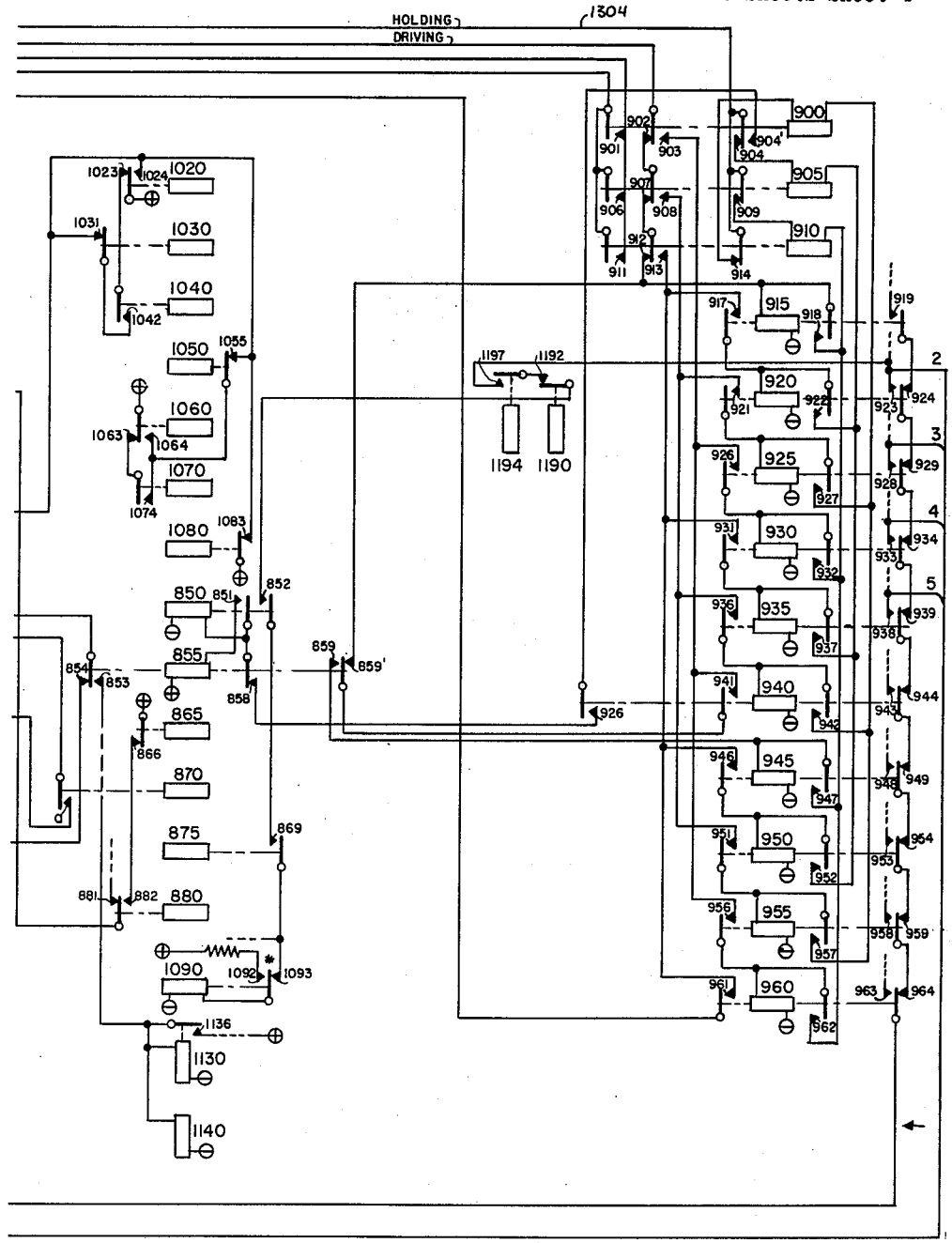

Relay 665 is operated by the switching equipment of FIGURES 1 and 2 as previously described. As shown, relay 665 in its operation is effective at make contacts 665–a to close a loop circuit to the transmitter, whereby the transmitter is signalled by the switching equipment to enable it to send signals over the channel.

The complex code circuit is connected to the switching equipment in the manner of the previous description.

At the substation end the receiver responds to pulses received over the channel, and in turn operates relay 1000 over an obvious circuit. The controlled and supervised devices work into the switching equipment in the manner described more fully in the previously cited patent.

The substation switching equipment operates transmitting relay 1010 as described hereinbefore, and at its contacts 1010–a, closes and opens a loop to the transmitter which enables the transmitter to signal over the channel.

The complex code unit at the substation works into the switching equipment as described hereinbefore.

With single channel operation, relay 665 operates to close its loop circuit to the transmitter at the control station end, which in turn places a signal on the channel to control the receiver at the control station end and at the substation end.

When relay 1010 operates to close its loop circuit to the transmitter at the substation end, the transmitter places a signal on the channel which is received by the receiver at the substation end and at the control station end.

With two channel operation (i.e. one for each direction), the activation of the control station transmitter by relay 665 results in the transmitter signalling over one channel, which signalling would be received by the receiver at the substation end only. With V-wiring connected, relay 680 would be directly operated by relay 665 over the circuit in FIGURE 5 which extends from direct positive potential over contacts 665–b, V-wiring, resistor G, and the winding of relay 680 to negative potential.

Also with two channel operation the activation of the substation transmitter by relay 1010 results in the transmitter signalling over the second channel, which signalling would be received by the receiver at the control station end only. With V'-wiring connected relay 1000 would be directly operated by relay 1010 over the circuit extending from direct positive potential, contacts 1010–b, V'-wiring, resistor G' and the winding of relay 1000 to negative potential.

Referring to FIGURE 6, there is shown thereat a carrier arrangement, etc., in which both lockout and complex code circuits are provided. The control and indication devices work into the control station switching equipment; and the controlled and supervised devices work into the substation switching equipment as previously disclosed.

Line relay 680 is operated over a circuit which extends over the special lockout circuit as described hereinbefore with reference to FIGURE 2; and relay 1000 is similarly operated by the special lockout circuit at the substation end.

Relay RR of FIGURE 6 is similar to relay RR of FIGURE 2 and is operated over a circuit in the control station receiver which extends from negative potential over the winding of relay RR through contacts in the receiver to direct positive potential. Contacts RR–a and RR–b connect into the lockout circuit as shown in FIGURE 2.

Relay RR' in the substation receiver is analogous.

With single frequency of operation, relay 665 in activating the control station transmitter, results in the transmitter signalling over the channel, which signalling is received by receivers at both ends resulting in the closure of contacts to effect the operation of relays RR and RR' which in turn effect the circuit operations previously described. Similarly relay 1010 in activating the substation transmitter results in the transmitter signalling over the channel, which signalling is received by receivers at both ends resulting in the operation of relays RR and RR' therein.

With two channel operation, the operation of relay 665 results in operation of relay RR' in the substation receiver; and directly operates relay 680 over the circuit which extends from direct positive potential, contacts 665–b, V-wiring, resistor G and the winding of relay 680 to negative potential. The operation of relay 1010 results in the operation of relay RR in the control station receiver; and directly operates relay 1000 over the circuit which extends from direct positive potential over contacts 1010–b, V'-wiring, resistor G' and the winding of relay 1000 to negative potential.

The system of FIGURES 5 and 6 operates in response to the occurrence of transients in the channel in the manner previously disclosed herein relative to the circuits of FIGURES 1–4.

While a particular embodiment of the invention has been shown and described, it is apparent that modifications and alterations may be made, and it is intended in the appended claims to cover all such modifications and alterations as may fall within the true spirit and scope of the invention.

What is claimed is:

1. In a supervisory system including at least a first and a second station coupled by a path over which sets of impulse signals are transmitted as a group to effect a control operation, signal transmitting means at each station for sending said signals including means for prefixing each group of impulse signal sets with a key code comprised of a predetermined number of impulses, transient protection means at each station for coding predetermined impulses of said key code of a group of the impulse signals by effecting a predetermined variation of the duration of said predetermined key code impulses relative to the other impulses in the key code, and signal responsive means including said transient protection unit at each station operative responsive to the receipt of a key code without said predetermined coded impulses of said predetermined variation in the proper sequence to generate a reset signal and means for coupling said reset signal to the reset equipment for the station to block access thereto for the system.

2. In a supervisory system including at least a first and a second station coupled by a path over which sets of impulse signals are transmitted as a group to effect a control operation, signal transmitting means at each station for sending said signals including means for prefixing each group of impulse signal sets with a key code comprised of a predetermined number of impulses, complex code means at each station for coding certain impulses of said key code of a group of the impulse signals by effecting a predetermined increase in the duration of said predetermined key code impulses relative to other impulses in the code, signal responsive means including said complex code unit at each station operative responsive to the receipt of a key code signal set without said predetermined occurs in said path during said predetermined time period. impulses of said increased duration at a predetermined interval in the sequence to initiate a reset signal for the system, lockout means operative responsive to initiation of a reset signal to introduce a predetermined time period prior to reset of the system, and means for extending said period a further time period for each impulse which occurs on said path during said predetermined time period.

3. In a supervisory system embodying at least a first and second station coupled by a path over which sets of impulse signals are transmitted for system control purposes, complex code means at one of said stations for enabling certain station selection equipment responsive only to receipt of a predetermined set of code signals including signal means for generating a control signal indicating the occurrence of signals in signal sets other than said predetermined set on said path, reset means operative to effect system reset, lockout means including reset enabling means operative to enable said reset means only after the elapse of a predetermined time delay period following generation of said control signal by said signalling means, and means for extending said period an additional period responsive to the occurrence of an additional one of said other signals on said path during said first predetermined time period.

4. In a supervisory system having at least a first and a second station coupled by a path over which sets of make-break impulse signals are transmitted for system control purposes, and control means for enabling each of said stations alternatively in the transmitting and receiving condition, code means at one station at least operative during transmission of signals by said station to add a predetermined additional period to the break period of at least a predetermined one of said impulses, and operative during receipt of signals by said station to enable certain station selection equipment responsive only to receipt of a signal set which includes said predetermined break interval, said code means including a first marker means operative during signal transmission by said station to mark the transmission of the make interval of the predetermined impulse, delay initiating means operative responsive to the occurrence of the break interval of the predetermined impulse only during signal transmission by said station, and a second marker means operative with said first marker means and said delay initiating means during signal transmission to extend the break interval following said make interval to said predetermined duration; a delay detection means operative only with said station in the receiving condition to mark the receipt of break intervals of at least said predetermined duration, and to operate with said first and second marker means to mark the period of receipt of said predetermined break interval following said predetermined make interval, and timing means for measuring a predetermined time period for said break interval operative in response to the expiration of said time period prior to the marking of the termination of said break period by said delay detection means to generate a reset signal for the system.

5. In a supervisory system including at least a first and a second station coupled by a path over which sets of make-break impulse signals are transmitted for system control purposes, code means at one station at least for introducing a predetermined additional period to the break period of at least a predetermined one of said signals, said code means including a first marker means for marking the transmission of the make interval of said predetermined impulse, delay means operatively controlled responsive to occurrence of the break interval of the predetermined impulse, and a second marker means operative with said delay means and said first marker means in a given sequence to generate a break interval of said predetermined increased duration for said predetermined impulse the sum of the time durations of the operations of the delay means and said first and second marker means in said sequence establishing the time duration of said break interval.

6. In a supervisory system including at least a first and a second station coupled by a path over which sets of impulse signals comprised of make-break intervals are transmitted for system control purposes, signal responsive means at one station, at least, operative to indicate the occurrence of the make-break intervals of each impulse in each signal set on said path, code means at said one station for enabling certain associated station selection equipment responsive only to receipt of a set of signals by said signal responsive means which includes predetermined intervals which are of a longer duration than other like intervals of said signal set including a first marker means operative to mark the transmisison of the make interval of said predetermined impulse whenever its associated station transmits an impulse set, delay means operatively controlled responsive to the occurrence of the break interval of the predetermined impulse, and a second marker means operative with said delay means and said first marker means in a given sequence to generate a break interval of a predetermined increased duration which is determined by the operating times of said delay means and said first and second marker means, a third marker means operative with said first and second marker means responsive to the receipt of said predetermined impulse at its associated station to mark the receipt of a break interval of at least said predetermined duration, and timing means operatively controlled by said third marker means to generate a reset signal whenever said break interval is longer than said predetermined increased duration.

7. In a supervisory system including at least a first and a second station coupled by a path over which sets of impulse signals comprised of make-break intervals are transmitted for system control purposes, signal responsive means at one station, at least, operative to indicate the occurrence of the make-break intervals of each impulse in each signal set on said path, code means at said one station for enabling certain associated station selection equipment responsive only to receipt of a set of signals by said signal responsive means which includes predetermined intervals which are of a longer duration than other like intervals of said signal set, and which are disposed at predetermined positions in the sequence in said signal set, said code means being operative responsive to the occurrence of signals of increased duration at other than said predetermined positions to generate a reset signal, reset means at each station, and means for coupling said reset signal to said reset means at said station.

8. In a supervisory system including at least a first and a second station coupled by a path over which sets of impulse signals comprised of make and break intervals are transmitted for system control purposes, signal responsive means at one station, at least, operative to indicate the occurrence of the make and break intervals of each of the signals on said channel including counting means for identifying the position of each impulse in each signal set, code means at said one station for enabling certain associated station selection equipment responsive only to receipt of a set of signals by said signal responsive means which includes at least one predetermined interval which is of a longer duration than other like intervals of said signal set and which is disposed at a predetermined numerical position in said signal set including marker means for determining the relative length of said predetermined interval as received, and means operatively controlled by said counting means only responsive to the receipt of the make interval immediately preceding the predetermined break interval to enable said marker means for response to said incoming impulse set and for disabling said marker means immediately after the receipt of the predetermined break interval of the proper duration, and timer means operative with said marker means to generate a reset signal whenever said interval is longer than the predetermined longer duration.

9. In a supervisory system including at least a first and a second station coupled by a path over which sets of make-break impulse signals are transmitted for system control purposes, code means at one station at least for enabling certain station selection equipment responsive only to receipt of a set of signals which includes at least one predetermined impulse having a break interval of a predetermined longer duration than the break intervals of the other impulses of said set, said code means comprising a first marker means for marking the receipt of the make interval of the predetermined impulse, a second marker means for marking the receipt of the break interval of the predeterimned impulse only when the break interval is of at least said predetermined duration, and a third marker means operative only responsive to operation of said first and second marker means to enable continued operation of the system, and to prepare a reset circuit in response to the failure of operation of said second marker means in response to the receipt of said break interval.

10. In a supervisory system including at least a first and a second station coupled by a path over which sets of make-break impulse signals are transmitted for system control purposes, code means at one station at least for enabling certain station selection equipment responsive only to receipt of a set of signals which includes at least one predetermnied impulse having a break interval of a predetermined longer duration than the break intervals of the other impulses of said set comprising a first marker means for marking the receipt of the make interval of the predetermined impulse, a second marker means for marking the receipt of the break interval of the predetermined impulse only when the break interval is of at least said predetermined duration, and a third marker means operatively controlled by said first and second marker means to prepare a reset signalling circuit responsive to receipt of a predetermined impulse having a break interval of a duration less than said predetermined duration.

11. A supervisory system as set forth in claim 10 which includes marker means for completing said reset circuit responsive to receipt of a subsequent impulse in said set.

12. In a supervisory system including at least a first and a second station coupled by a path over which sets of make-break impulse signals are transmitted for system control purposes, code means at one station, at least, for enabling certain station selection equipment responsive only to receipt of a set of signals which includes at least one predetermined impulse having a break interval of a predetermnied longer duration than the break intervals of the other impulses of said set comprising a first marker means for marking the receipt of the make interval of the predetermined impulse, a second marker means for marking the receipt of the break interval of the predetermined impulse only when the break interval is of at least the predetermined duration, timing means operative to measure a predetermined time period only responsive to the operation of said second marker means, and means controlled by said timing means to complete a reset circuit responsive to the receipt at said one station of a break period for said predetermined impulse which is of a longer duration than said predetermined duration.

13. In a supervisory system including at least a first and a second station coupled by a path over which sets of make-break impulse signals are transmitted for system control purposes, code means at one station, at least, for enabling certain station selection equipment responsive only to receipt of a set of signals which includes predetermined impulses which have a break interval of a predetermined longer duration than the break intervals of the other impulses of said set, said code means comprising an individual marker means for each one of said predetermined impulses operative to mark the receipt of the make interval of its preassigned one of said predetermined impulses, a common marker means for marking the receipt of only break intervals which are of at least said predetermined duration, an additional individual marker means for each one of said predetermined impulses controlled by the first individual marker means and said common marker means to mark the receipt of the predetermined make and break interval for its preassigned predetermined impulse, and reset control means for completing a system reset control circuit operatively controlled by each of said additional individual marker means only responsive to failure to receive the predetermined break interval for its predetermined impulse.

References Cited in the file of this patent

UNITED STATES PATENTS

| | | |
|---|---|---|
| 1,790,866 | Hudd | Feb. 3, 1931 |
| 1,923,718 | Frink | Aug. 22, 1933 |
| 2,059,204 | Boswan | Nov. 3, 1936 |
| 2,116,990 | Watanabe | May 10, 1938 |
| 2,276,646 | Boswau | Mar. 17, 1942 |
| 2,398,594 | Muehter | Apr. 16, 1946 |
| 2,406,834 | Hartley et al. | Sept. 3, 1946 |
| 2,616,959 | Breese et al. | Nov. 4, 1952 |
| 2,670,463 | Raymond et al. | Feb. 23, 1954 |
| 2,708,744 | Neiswinter | May 17, 1955 |
| 2,834,003 | Abelew | May 6, 1958 |
| 2,944,247 | Breese | July 5, 1960 |

UNITED STATES PATENT OFFICE
CERTIFICATE OF CORRECTION

Patent No. 3,119,981 January 28, 1964

Lemuel R. Breese

It is hereby certified that error appears in the above numbered patent requiring correction and that the said Letters Patent should read as corrected below.

Column 34, line 45, strike out "occurs in said path during said predetermined time period."

Signed and sealed this 4th day of August 1964.

(SEAL)
Attest:

ERNEST W. SWIDER
Attesting Officer

EDWARD J. BRENNER
Commissioner of Patents